(12) United States Patent
Fujita et al.

(10) Patent No.: US 6,419,647 B1
(45) Date of Patent: Jul. 16, 2002

(54) MOTION SICKNESS EXPRESSION APPARATUS

(75) Inventors: Etsunori Fujita; Eiji Sugimoto; Yumi Ogura, all of Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 09/573,930

(22) Filed: May 18, 2000

(30) Foreign Application Priority Data

May 18, 1999 (JP) .......................................... 11-137760

(51) Int. Cl.[7] .......................... A61B 5/103; A61B 5/117
(52) U.S. Cl. ...................... 600/595; 128/897; 297/311
(58) Field of Search ................................ 600/595, 587; 128/897; 601/49, 50, 51, 53, 59, 78; 297/181, 311, 313, 314, 344.1

(56) References Cited

U.S. PATENT DOCUMENTS

| | | | | |
|---|---|---|---|---|
| 4,413,522 A | * | 11/1983 | Leatherwood et al. | 73/646 |
| 4,930,435 A | * | 6/1990 | Newman | 114/191 |
| 5,348,370 A | * | 9/1994 | Fukuoka | 297/217 |
| 5,533,784 A | * | 7/1996 | Fukuoka | 297/217.1 |
| 6,056,362 A | * | 5/2000 | de la Haye | 297/314 |

* cited by examiner

Primary Examiner—Robert L. Nasser
Assistant Examiner—Charles Marmor, II
(74) Attorney, Agent, or Firm—Steinberg & Raskin, P.C.

(57) ABSTRACT

A motion sickness expression apparatus capable of causing expression of motion sickness on a person riding in any posture on the apparatus without setting the apparatus in a vehicle. The apparatus includes a base, a vertical vibrator to which the vibration application unit is connected so as to be vertically movable with respect to the base through link members and which is constructed so as to support the body carrying section thereon, and a magnetic spring mechanism including permanent magnets arranged on the base and vertical vibrator so as to repel each other, respectively. The magnetic spring mechanism also includes an actuator for moving the permanent magnet arranged on the base to vary areas of the permanent magnets opposite to each other, leading to vibration of the vertical vibrator. Vibration of the body carrying section can be controlled through the vertical vibrator vibrated by repulsion force of the permanent magnet on the vertical vibrator with respect to the permanent magnet on the base due to driving of the actuator so that an acceleration of vibration of the body carrying section falls within a motion sickness expression region.

21 Claims, 21 Drawing Sheets

(a)

(b)

US 6,419,647 B1

MOTION SICKNESS EXPRESSION APPARATUS

BACKGROUND OF THE INVENTION

This invention relates to a motion sickness expression apparatus, and more particularly to a motion sickness expression apparatus which is adapted to bring about expression of motion sickness such as acceleration sickness, kinetosis or the like on a person carried in any optional posture on a body carrying section of the apparatus.

Motion sickness is neurosis appearing or expressed on a person when he or she receives a motion impetus in any vehicle or conveyance and causes symptoms such as nausea, vomiting and the like. In order to deal with motion sickness, an approach such as administration of a motion sickness medicine before riding, administration of a remedy medicine for relieving motion sickness after expression of the motion sickness or the like is generally adopted.

In general, such medicines are ultimately clinically tried on persons actually riding vehicles through an animal experiment after development thereof. Thus, an experiment of the medicines on a human being requires to run a vehicle which he or she rides at a predetermined velocity for a predetermined period of time at every experiment. Unfortunately, this requires much time and labor. Thus, it is highly desirable to develop an apparatus which is capable of actually attaining expression of motion sickness in a laboratory and repeating the experiment many times.

Also, development of such an apparatus which brings about expression of motion sickness at a stage of a laboratory would lead to development of seats for various vehicles such as an automobile, a train and the like without requiring to actually set the seats in the vehicles.

SUMMARY OF THE INVENTION

The present invention has been made in view of the foregoing disadvantage of the prior art while taking notice of the fact that as a result of a careful study by the inventors, incorporation of a magnetic spring in a motion sickness expression apparatus permits the apparatus to readily generate vibration in a motion sickness expression region while being simplified in structure.

Accordingly, it is an object of the present invention to provide a motion sickness expression apparatus which is capable of causing expression of motion sickness on a person carrying in any posture on the apparatus without setting the apparatus in a vehicle.

It is another object of the present invention to provide a motion sickness expression apparatus which is capable of generating vibration in a motion sickness expression region while being simplified in structure.

In accordance with the present invention, a motion sickness expression apparatus is provided, which includes a body carrying section for carrying a human body thereon and a vibration application unit for supporting the body carrying unit in a manner to permit vibration of the body carrying unit.

The vibration application unit includes a base, a vertical vibrator to which the base is connected so as to be vertically movable with respect to the base through link members and which is constructed so as to support the body carrying section thereon, and a magnetic spring mechanism including permanent magnets arranged on the base and vertical vibrator so as to repel each other, respectively. The magnetic spring mechanism also includes an actuator for moving the permanent magnet arranged on the base to vary areas of the permanent magnets opposite to each other, leading to vibration of the vertical vibrator. Thus, vibration of the body carrying section can be controlled through the vertical vibrator vibrated by repulsion force of the permanent magnet on the vertical vibrator with respect to the permanent magnet on the base due to driving of the actuator so that an acceleration of vibration of the body carrying section falls within a motion sickness expression region.

Thus, the present invention is featured by formation of any random waveform through excitation by amplification (pseudo-resonance or amplification excitation using energy accumulated in a magnetic spring) or excitation by attenuation rather than formation of one-to-one random waveform by electrical control. Also, the present invention is featured by excitation using a magnitude of a magnetic gradient in a magnetic circuit.

Also, in accordance with the present invention, a motion sickness expression apparatus is provided, which includes a body carrying section for carrying a human body thereon and a vibration application unit for supporting the body carrying unit in a manner to permit vibration of the body carrying unit.

The vibration application unit includes a base, a vertical vibrator to which the base is connected so as to be vertically movable with respect to the base through link members, a horizontal vibrator mounted on the vertical vibrator so as to be horizontally movable and constructed so as to support the body carrying section thereon, and a magnetic spring mechanism including permanent magnets arranged on the base and vertical vibrator so as to repel each other, respectively. The magnetic spring mechanism also includes an actuator for moving the permanent magnet arranged on the base to vary areas of the permanent magnets opposite to each other, leading to vibration of the vertical vibrator. Thus, vibration of the body carrying section can be controlled through the vertical vibrator and horizontal vibrator vibrated by repulsion force of the permanent magnet on the vertical vibrator with respect to the permanent magnet on the base due to driving of the actuator so that an acceleration of vibration of the body carrying section falls within a motion sickness expression region.

In a preferred embodiment of the present invention, the permanent magnet on the base and the permanent magnet on the vertical vibrator during non-application of vibration are arranged in positional relationship which permits the permanent magnets to be contacted with each other at portions thereof increased in magnetic gradient.

In a preferred embodiment of the present invention, the apparatus further includes an auxiliary spring mechanism for supplementing holding force for spacedly holding the permanent magnets at a predetermined interval. The auxiliary spring mechanism is arranged between the base and the vertical vibrator.

In a preferred embodiment of the present invention, the apparatus further includes a position holding means for keeping opposite areas of the permanent magnet on the base and the permanent magnet on the vertical vibrator and an interval therebetween during non-application of vibration constant.

In a preferred embodiment of the present invention, the position holding means includes a first position holding magnet arranged forwardly or rearwardly in a direction of movement of a moving structure of an actuator for movably holding the permanent magnet arranged on the base and a second position holding magnet which is arranged opposite to the first position holding magnet on the base and of which an opposite area with respect to the first position holding magnet is adjustable.

In a preferred embodiment of the present invention, the horizontal vibrator includes a base frame carried on the vertical vibrator, a horizontally movable member arranged so as to be movable with respect to the base frame, and an actuator of which a moving structure horizontally moving is connected through spring members to the horizontally movable member.

In a preferred embodiment of the present invention, the apparatus includes an additional horizontal vibrator arranged in a direction perpendicular to a direction of vibration of the horizontal vibrator on the horizontal vibrator.

In a preferred embodiment of the present invention, the body carrying section is formed into a seat-like configuration and includes a seat cushion and seat back.

In a preferred embodiment of the present invention, the permanent magnets arranged on the base and vertical vibrator each are constituted by a multi-pole magnet.

In a preferred embodiment of the present invention, the permanent magnets arranged on the base and vertical vibrator each are constituted by a double-pole magnet. The permanent magnets are so arranged that the same poles thereof are opposite to each other while keeping a direction of operation of the permanent magnet on the base parallel to an interface between an N pole of the double-pole magnet and an S pole thereof.

In a preferred embodiment of the present invention, the permanent magnets arranged on the base and vertical vibrator each are constituted by a double-pole magnet. The permanent magnets are so arranged that the same poles thereof are opposite to each other while keeping a direction of operation of the permanent magnet on the base perpendicular to an interface between an N pole of the double-pole magnet and an S pole thereof.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, a motion sickness expression apparatus according to the present invention will be described hereinafter with reference to the accompanying drawings.

Figure 1:
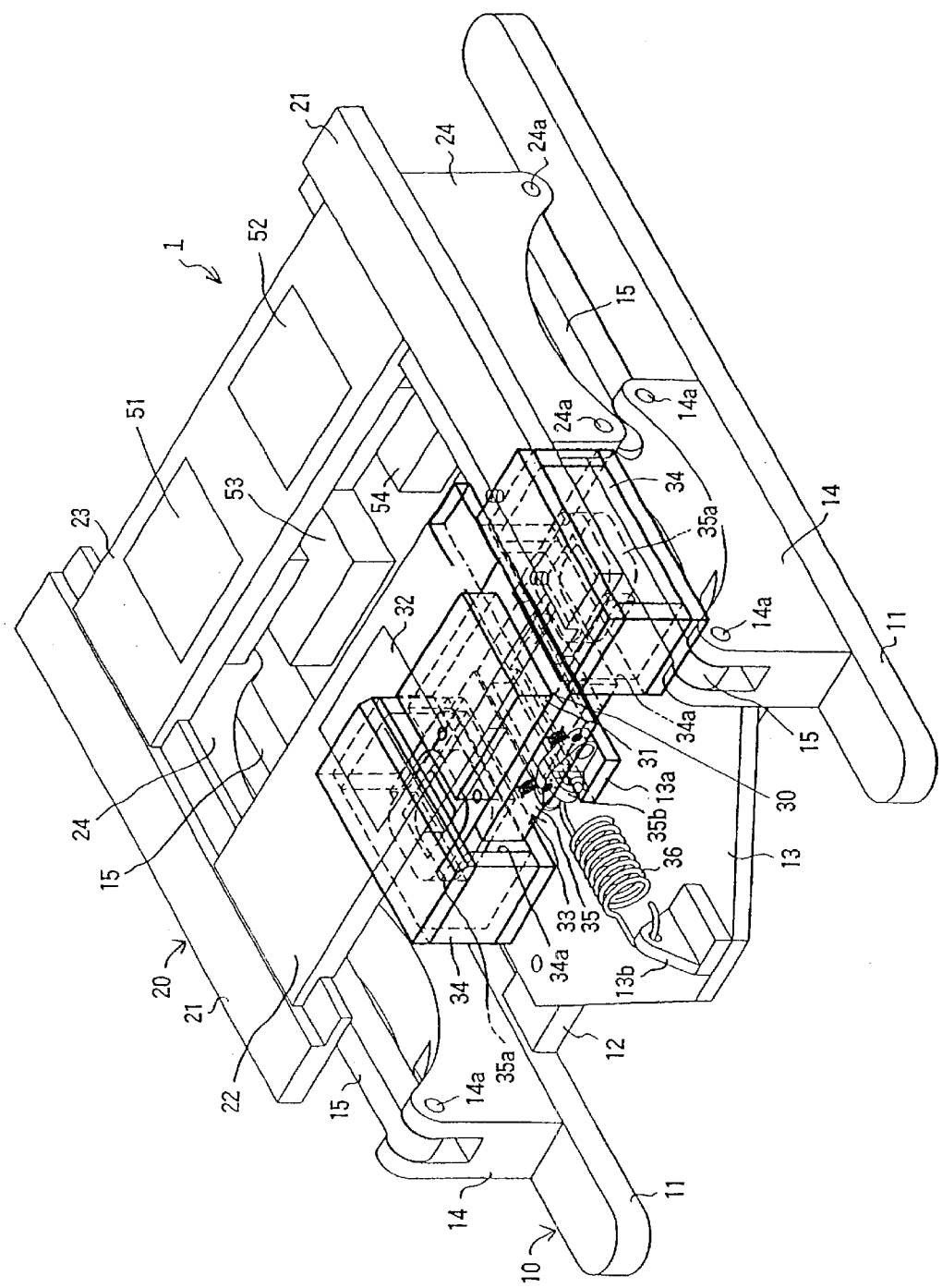
FIG. 1 is a perspective view showing a vibration application unit incorporated in a first embodiment of a motion sickness expression apparatus according the present invention.
Figure 2:
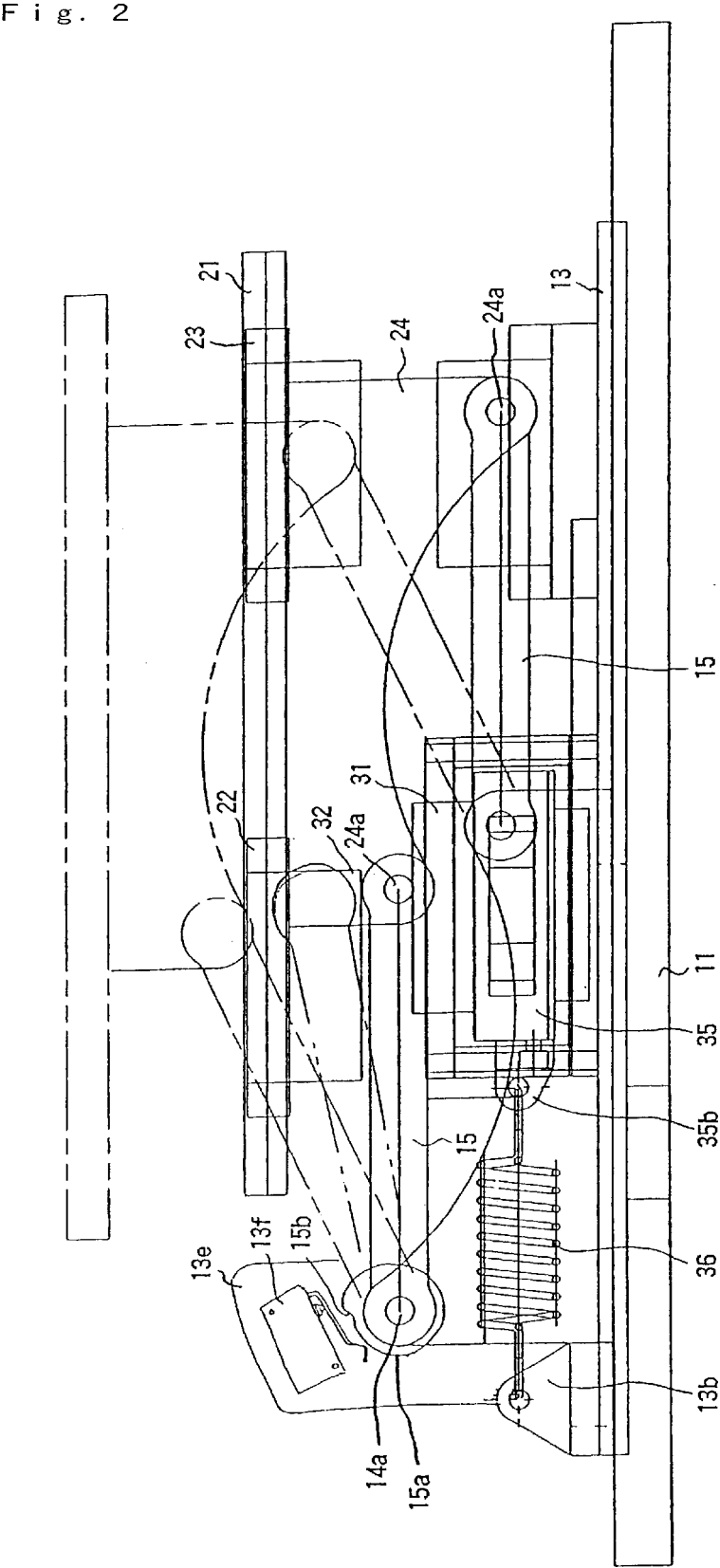
FIG. 2 is a schematic view showing a mechanism for stopping runaway of an actuator which is incorporated in the embodiment of FIG. 1 by way of example.

Referring first to FIG. 1, a vibration application unit incorporated in an embodiment of a motion sickness expression apparatus according to the present invention is illustrated. The vibration application unit generally designated at reference numeral 1 includes a base 10 set on a stationary surface such as a surface of a floor or the like. The base 10 includes a pair of legs 11 arranged so as to be spaced from each other at a predetermined interval, a connection frame 12 arranged between the legs 11 to connect the legs 11 to each other therethrough, and a base plate 13 fixedly mounted on the connection frame 12. The base plate 13 is provided thereon with a part of a magnetic spring mechanism 30 described hereinafter. The legs 11 each are provided thereon with a bracket 14, which is then mounted at a portion thereof in proximity to both ends thereof with link members 15 through pivot pins 14a so as to be pivotably moved thereabout. The link members 15 each are connected at one end thereof to the bracket 14. Also, the link members 15 each are pivotably connected at the other end thereof through a pivot pin 24a to each of brackets 24 mounted on a vertical vibrator 20 described hereinafter, as shown in FIG. 2. Thus, the link members 15 mounted on one of the legs 11 and those mounted on the other leg 11 cooperate with each other to constitute a parallel linkage.

Figure 14:
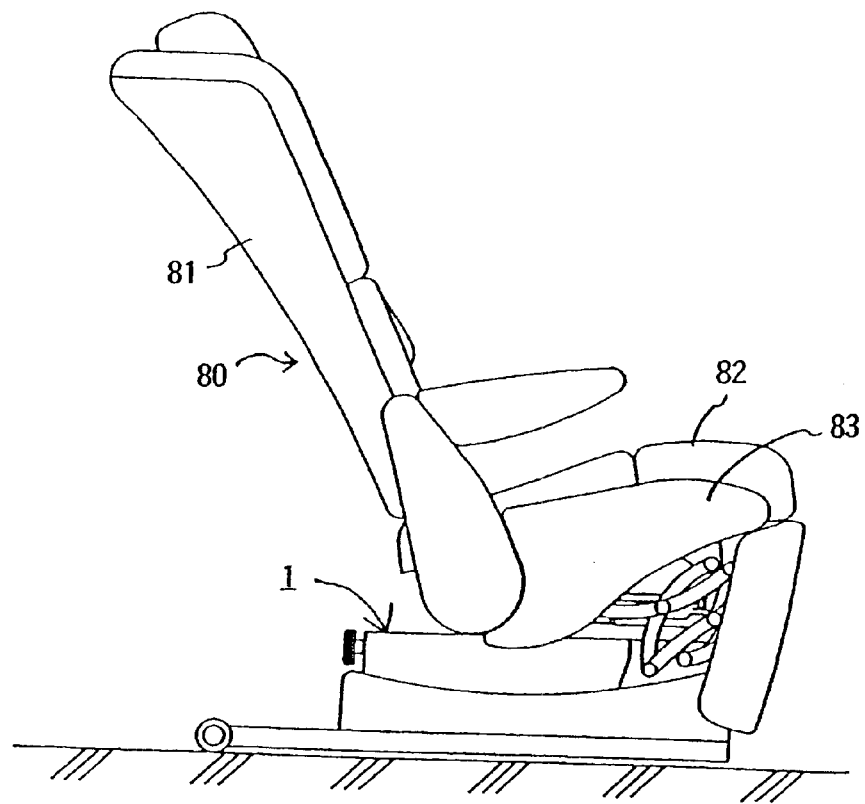
FIG. 14 is a side elevation view showing an embodiment of a motion sickness expression apparatus according to the present invention.

The vertical vibrator 20 includes a pair of side frames 21 arranged opposite to each other and so as to be spaced from each other at an interval substantially identical with that between the legs 11 of the base 10. The side frames 21 in a pair each are mounted thereon with the bracket 24 in a manner to extend downwardly therefrom. The bracket 24 has the link members 15 connected thereto through the other end of the link members 15. The vertical vibrator 20 also includes front and rear connection plates 22 and 23 arranged between the side frames 21 so as to connect the side frames 21 to each other therethrough. In the illustrated embodiment, a body carrying section 80 for carrying a human body thereon is optionally supported on the side frames 21 and connection plates 22 and 23 through or without a connection member (not shown). For example, when the body carrying section 80, which may be constructed of a seat back 81 and a seat cushion 82 into a seat-like structure as shown in FIG. 14, is employed, the seat cushion 82 is supported on the side frames 21 and front and rear connection plates 22 and 23 of the vibration application unit 1 through a connection member 83. The seat-type human carrying section 80 permits a person to be supported or carried thereon while keeping him or her seated thereon or facing upward thereon by adjusting an inclination angle of the seat back 81.

The magnetic spring mechanism 30 briefly described above includes a first permanent magnet 31 arranged on a side of the base 10 and a second permanent magnet 32 arranged on a side of the vertical vibrator 20. The first permanent magnet 31 is securely mounted on an upper surface of a moving structure 35, which constitutes a part of an actuator 33 described hereinafter, arranged so as to be movable in a longitudinal direction of the vibration application unit 1 on the base plate 13 of the base 10. The second permanent magnet 32 is fixed on the front connection plate 22 constituting a part of the vertical vibrator 20. The first permanent magnet 31 and second permanent magnet 32 are arranged in positional relationship which permits the first permanent magnet 31 to be rendered at least a part thereof opposite to any portion of the second permanent magnet 32 within a range of movement of the first permanent magnet 31.

The actuator 33 may be constructed in substantially the same manner as an electrokinetic actuator disclosed in, for example, Japanese Patent Application Laid-Open Publication No. 201211/1998. In the illustrated embodiment, the actuator 33 includes box-like body casings 34 arranged on the base plate 13 between the legs 11 in a manner to be opposite to each other and spaced from each other at a predetermined interval, as well as the moving structure 35. The body casings 34 are formed on surfaces thereof opposite to each other with slits 34a and the moving structure 35 is provided on both sides thereof with vanes 35a in a manner to project therefrom. Also, the moving structure 35 is formed on a lower surface thereof with a groove, which is engaged with a linear guide plate 13a arranged on the base plate 13 so as to extend in the longitudinal direction, so that the moving structure 35 may be moved along the linear guide plate 13a. The vanes 35a are inserted into the body casings 34 through the slits 34a. The vanes 35a each have a coil (not shown) wound thereon and are provided on a portion thereof positioned in each of the body casings with permanent magnets (not shown) in a manner to be spaced from each other in a vertical direction of the coil so that opposite magnetic poles thereof are opposite to each other. Thus, excitation of the coil due to flowing of a pulse current therethrough permits force to be applied to the coil on the basis of the Flemings's left-hand rule, so that the moving structure 35 may be moved along the linear guide plate 13a in the longitudinal direction. Also, in the illustrated embodiment, the moving structure 35 is provided on a front surface thereof with a holding element 35b and correspondingly the base plate 13 is provided on a front end thereof with a holding element 13b. Reference numeral 36 designates a coiled spring 36 arranged between both holding elements 35b and 13b. The coiled spring 36 functions to render an initial operation position of the moving structure 35 constant.

Thus, when the actuator 33 is activated or started to actuate the moving structure 35, an area of the first permanent magnet opposite to the second permanent magnet 32 is varied, leading to a variation in repulsion force therebetween, resulting in the vertical vibrator 20 being vertically vibrated.

In this instance, the vertical vibrator 20 is preferably vertically moved even when a range of operation thereof is reduced. For this purpose, an initial set position (opposite area, spaced distance) of the first permanent magnet 31 and that of the second permanent magnet 32 are preferably set so that a portion of a magnetic gradient of the first permanent magnet 31 which is desired as large as possible and that of the second permanent magnet 32 are contiguous to each other. Mutual contact between the portions increased in magnetic gradient leads to an increase in spring constant, to thereby permit the vertical vibrator 20 to be vibrated even when a variation in opposite area is slight.

In the illustrated embodiment, the first permanent magnet 31 and second permanent magnet 32 each may be constituted by a single single-pole magnet. Alternatively, the illustrated embodiment may be so constructed that the first and second permanent magnets 31 and 32 each are increased to two or more in the number of poles to vary a magnetic gradient or a posture in which the permanent magnets 31 and 32 each are arranged is shifted by an angle of 90 degrees to vary a substantial direction in which the first permanent magnet 31 approaches the second permanent magnet 32. This permits the moving structure 35 to be provided with various vibration characteristics, resulting in application of random vibration being attained, to thereby more facilitate expression of motion sickness.

Figure 20:
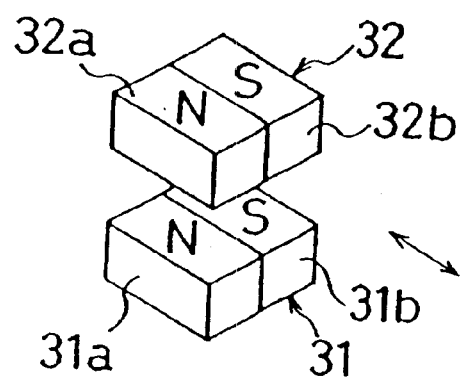
FIGS. 20(a) and 20(b) each are a schematic view showing a double-pole magnet by way of example.
Figure 20:
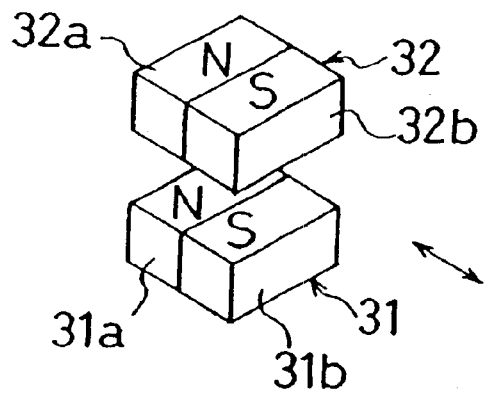

The first permanent magnet 31 and second permanent magnet 32 may be constructed as shown in FIG. 20(a). More specifically, the first permanent magnet 31 is formed by combining rectangular magnets 31a and 31b different in pole from each other with each other in a square manner and the second permanent magnet 32 is likewise formed of rectangular heteropolar magnets 32a and 32b in a like manner. Then, the first and second permanent magnets 31 and 32 each thus formed of the double-pole magnet are so arranged that same poles thereof are rendered opposite to each other.

In this instance, the arrangement, as shown in FIG. 20(a), may be carried out so that when the first permanent magnet 31 arranged on the side of the base 10 is operated, a direction of operation of the first permanent magnet 31 is rendered parallel to an interface between N and S poles of the double-pole magnets. Alternatively, as shown in FIG. 20(b), it may be carried out so that a direction of operation of the first permanent magnet 31 is rendered perpendicular to an interface between the N and S poles of the double-pole magnets.

Figure 21:
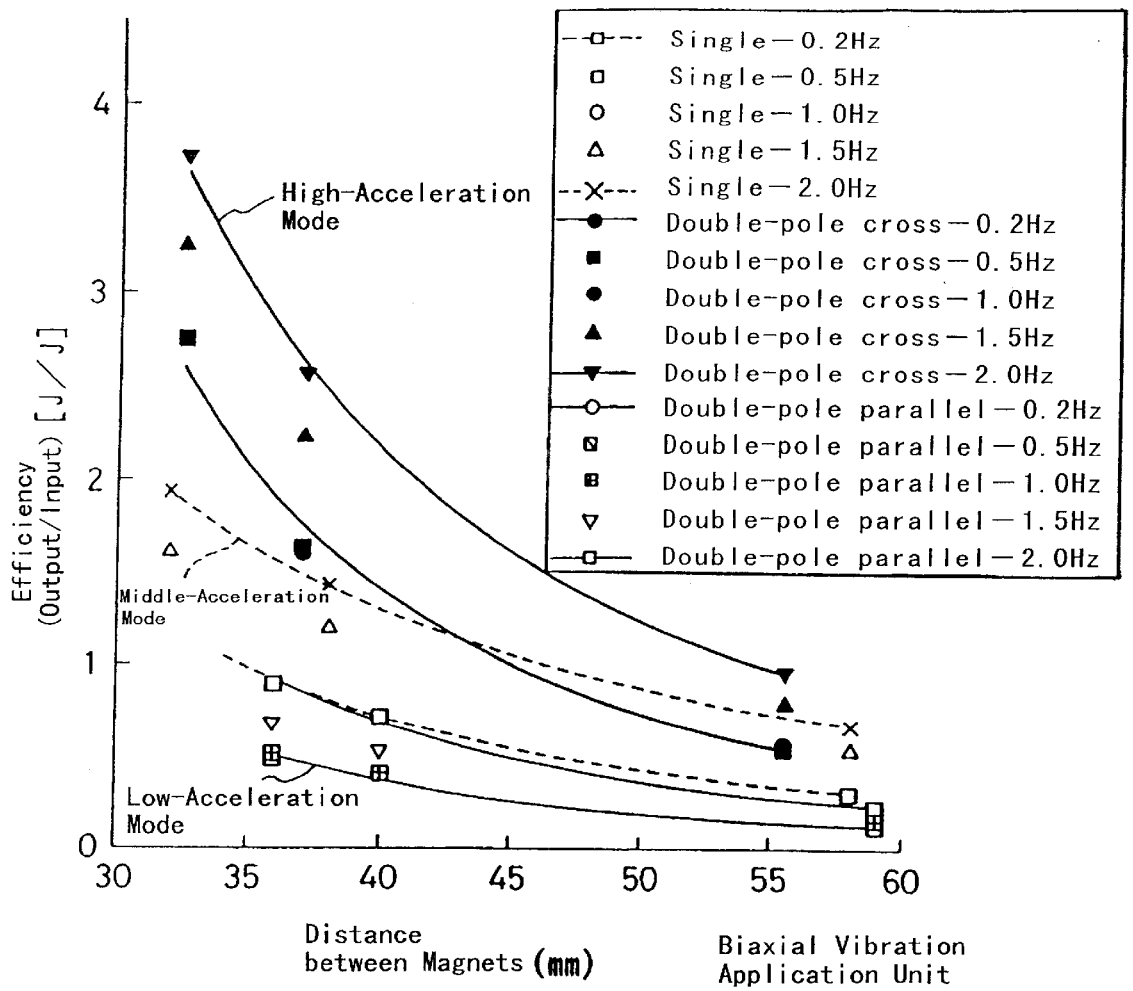
FIG. 21 is a graphical representation showing results of measurement of repulsion force carried out on each of a single-pole magnet and the double-pole magnets shown in FIGS. 20(a) and 20(b)

Repulsion force was measured on the permanent magnets each constituted by the single-pole magnet and those constructed as shown in FIGS. 20(a) and 20(b). The results were as shown in FIG. 21. As noted from FIG. 21, the repulsion force was maximum in the arrangement shown in FIG. 20(b) and minimum in FIG. 20(a).

Figure 22:
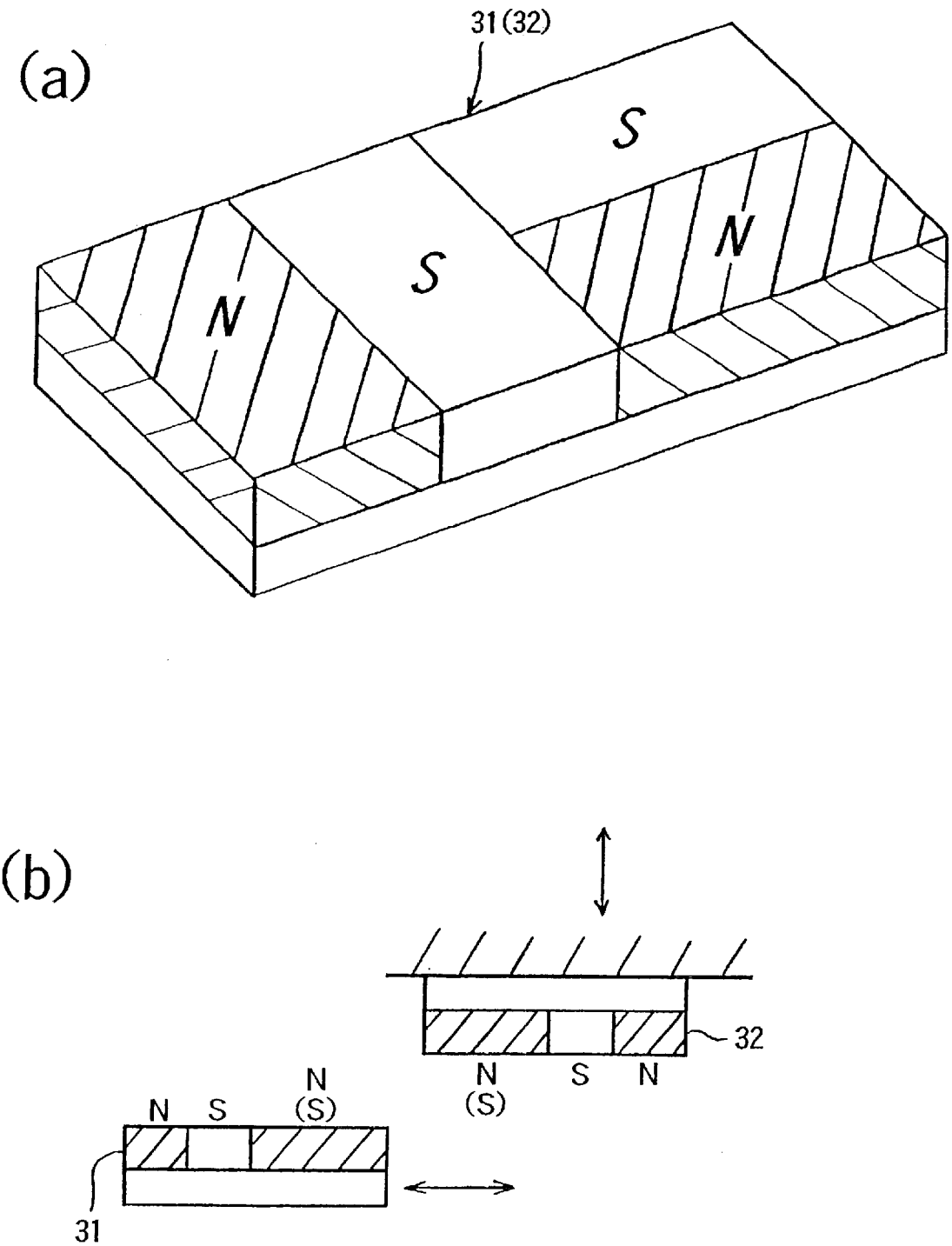
FIGS. 22(a) and 22(b) each are a schematic view showing a multi-pole magnet by way of example.

Also, the first and second permanent magnets 21 and 22 may be constituted of a multi-pole magnet as shown in FIGS. 22(a) and 22(b). More particularly, the permanent magnets each may be constituted by a quadripole magnet as shown in FIG. 22(a), which may be then arranged so that the same poles are opposite to each other to provide each of the first and second permanent magnets 31 and 32 as shown in FIG. 22(b). Use of such a multi-pole magnet likewise permits generation of random vibration.

Now, the manner of operation of the vibration application unit 1 thus constructed will be described.

First of all, the actuator 33 of the vibration application unit 1 is excited while keeping a person carried on the body carrying section 80 shown in FIG. 14. This permits the moving structure 35 to be moved in the longitudinal direction, leading to movement of the first permanent magnet 31 in the longitudinal direction. Such movement of the first permanent magnet 31 causes an opposite area of the first permanent magnet 31 opposite to the second permanent magnet 32 to be varied. This results in a position at which a magnetic force line of the first permanent magnet 31 and that of the second permanent magnet 32 are contacted with each other being varied or repulsion force being varied, so that the second permanent magnet 32 may be vertically moved. This permits vibration of the vertical vibrator 20 on which the second permanent magnet 32 is held, leading to vibration of the body carrying section 80.

Figure 19:
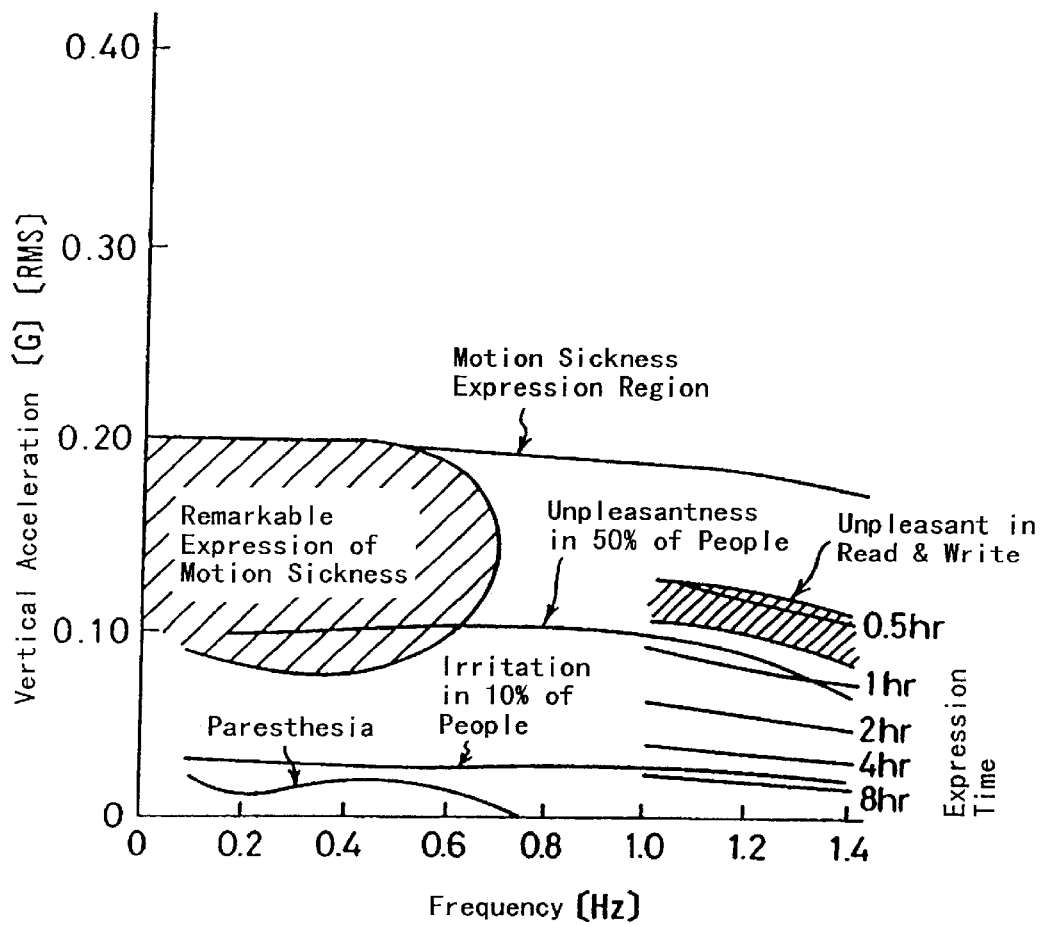
FIG. 19 is a graphical representation showing relationship between a frequency of vibration and an acceleration thereof and expression of motion sickness.

The body carrying section 80 is controlled by the actuator described above so that it is vibrated at a frequency as low as 0.5 Hz or less and an acceleration as low as 0.20 G or less. As shown in FIG. 19, motion sickness typically appears or expresses at a frequency of about 0.7 Hz or less and an acceleration of 0.10 to 0.20 G because lymph in semicircular canals of a human body has a natural frequency of about 0.5 Hz. Also, as shown in FIG. 19, a frequency somewhat higher or lower than the range causes expression of any motion sickness such as unpleasantness or irritation due to resonance with other organs such as the internal organs with lapse of time.

In the illustrated embodiment, the magnetic spring mechanism is incorporated, so that setting of both a frequency and an acceleration of vibration of the body carrying section within the above-described range merely requires movement of the first permanent magnet 31 in the longitudinal direction, therefore, the actuator incorporated is not required to exhibit an increased output, leading to a reduction in manufacturing cost of the apparatus. Application of vibration at such a low frequency and a low acceleration as described above requires to reduce a spring constant. On the contrary, if a metal spring were used for this purpose, it would be required to increase a stroke of the spring, leading to large-sizing of the apparatus.

Also, any optional random waveform can be obtained due to excitation through a spring system provided by the magnetic spring mechanism, to thereby facilitate expression of motion sickness. In addition, excitation is carried out depending on a magnitude of a magnetic gradient, so that a shock waveform increased in crest factor value which is hard to predict may be produced, to thereby contribute to expression of motion sickness.

A safety unit is preferably arranged in order to prevent vibration from being excessive due to runaway of the actuator 33. Such a safety unit, as shown in FIG. 2, may be constructed by arranging a guide plate 15a adapted to be moved in association with movement of any one of the link member 15 and arranging a limit switch 13f on a plate 13e mounted on the base 10 in a manner to be opposite to the guide plate 15a. The guide plate 15a is formed thereon with a contact section 15b contacted with the limit switch 13f when a rotational angle of the link member 15 reaches a predetermined level or more. Thus, when runaway of the actuator 33 occurs due to any cause to increase a range of movement of the first permanent magnet 31, to thereby cause substantial repulsion of the second permanent magnet 32 against the first permanent magnet, resulting in a range of operation of the vertical vibrator 20 exceeding a predetermined level, a rotational angle of the link member 15 is increased, so that the contact section 15b of the guide plate 15a pivotally moved with rotation of the link member 15 is contacted with the limit switch 13f to generate an electrical signal, which is then inputted to a controller (not shown) of the actuator 33 to stop actuation of the actuator 33.

Figure 3:
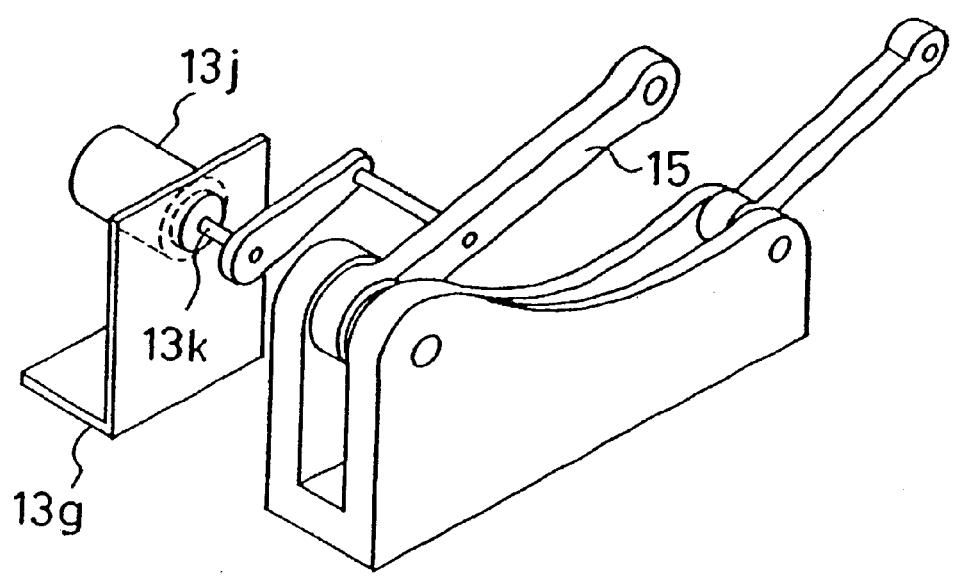
FIG. 3 is a schematic view showing a modification of a mechanism for stopping runaway of an actuator which is incorporated in the embodiment of FIG. 1.

Alternatively, the safety unit, as shown in FIG. 3, may be constructed in such a manner that a rotary encoder 13j is mounted on a mount plate 13g fixed on the base 10 and the link member 15 is connected to an output shaft 13k of the rotary encoder 13j, to thereby detect an angular displacement of the link member 15 and an angular acceleration thereof, so that when the angular displacement and angular acceleration are out of a predetermined range, a stop signal is inputted to the controller of the actuator 33.

Figure 4:
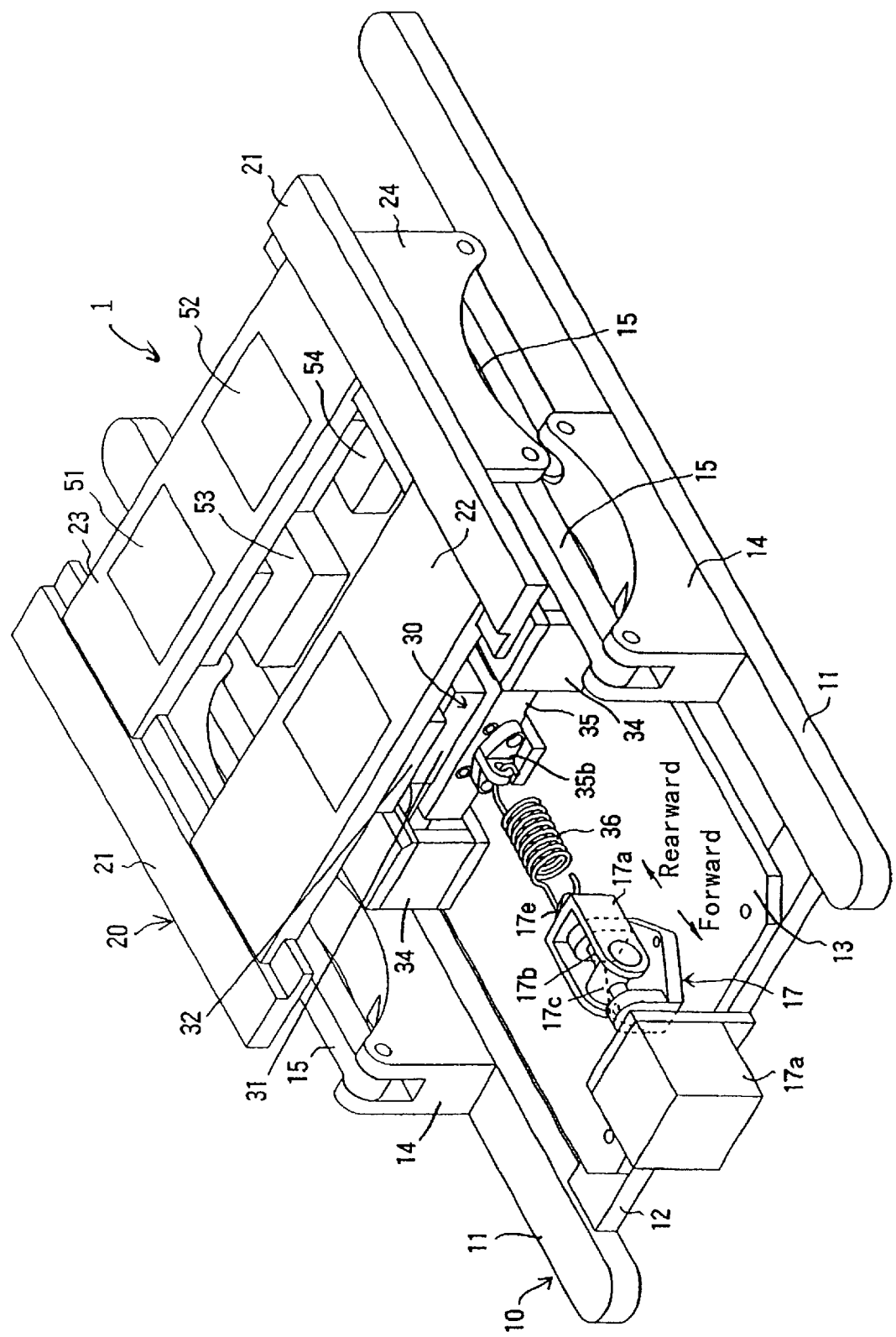
FIG. 4 is a perspective view showing a vibration application unit incorporated a second embodiment of a motion sickness expression apparatus according to the present invention.

Referring now to FIG. 4, a second embodiment of the present invention is illustrated. In the illustrated embodiment, a coiled spring 36 is engaged at one end thereof with a holding element 35b provided on a front surface of a moving structure 35 of an actuator 33 and connected at the other end thereof to an elastic force adjusting mechanism 17 provided on a forward end of a base plate 13.

The elastic force adjusting mechanism 17 includes a rotary motor 17a, a screw shaft 17b rotated by the rotary motor 17a, a nut member 17c threadedly fitted on the screw shaft 17b and a U-shaped frame 17d pivotally supported at a distal end thereof on the nut member 17c. The U-shaped frame 17d is provided on a rear surface thereof with a holding section 17e, with which the coiled spring 36 is engaged at the other end thereof. The remaining part of the second embodiment may be constructed in substantially the same manner as the embodiment described above.

When a person gets on the body carrying section 80, his or her body weight causes a vertical vibrator 20 to be pivotally moved in a longitudinal direction thereof. This causes a variation in repulsion force between a first permanent magnet 31 and a second permanent magnet 32 which are arranged on the vertical vibrator 20, so that the first permanent magnet 31 is shifted in the longitudinal direction. This fails to permit initial set positional relationship between the first permanent magnet 31 and the second permanent magnet 32 to be stable. More particularly, an initial interval between both magnets 31 and 32 and an opposite area of each of the magnets opposite to each other are varied depending on the body weight, to thereby fail to render load by the actuator 33 constant or uniform, resulting in possibly failing to obtain a low frequency and a low acceleration desired.

However, the illustrated embodiment permits elastic force of the coiled spring 36 to be adjusted or controlled by driving the rotary motor 17a of the elastic force adjusting mechanism 17 to vary a position at which the nut member 17c is threadedly fitted on the screw shaft 17b, so that an initial position of the moving structure 35 and first permanent magnet 31 with respect to the second permanent magnet 32 may be stabilized. Thus, it will be noted that in the illustrated embodiment, the elastic force adjusting mechanism 17 functions as a position holding means for keeping an opposite area of each of the first and second permanent magnets 31 and 32 opposite to each other and an interval therebetween during non-application of vibration constant.

Figure 5:
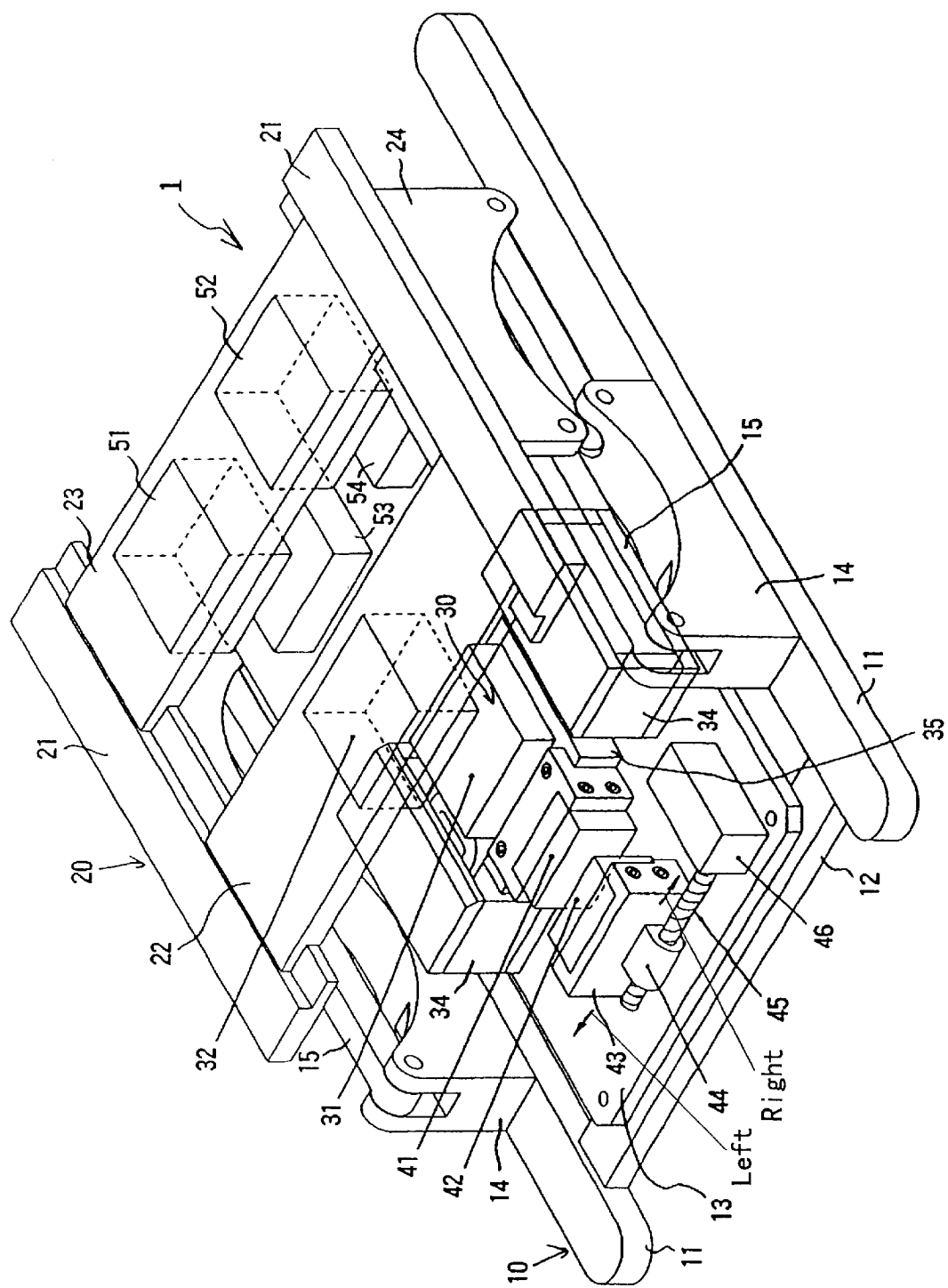
FIG. 5 is a perspective view showing a vibration application unit incorporated in a third embodiment of a motion sickness expression apparatus according to the present invention.
Figure 6:
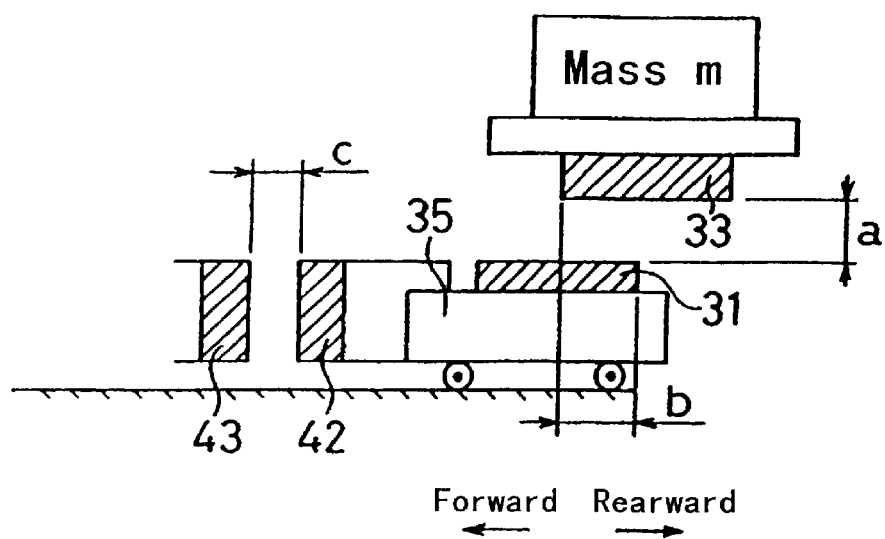
FIG. 6 is a schematic diagrammatic view showing operation of a position holding means for the vibration application unit shown in FIG. 3.

Referring now to FIG. 5, a third embodiment of the present invention is illustrated. In the illustrated embodiment, a position holding means for keeping an opposite area of each of first and second permanent magnets 31 and 32 opposite to each other and an interval therebetween during non-application of vibration constant is constructed in a manner different from that of the second embodiment described above. More particularly, in the illustrated embodiment, the position holding means includes a first position holding magnet 41 arranged in front of a moving structure 35 for holding the first permanent magnet 31 thereon and a second position holding magnet 42 arranged with respect to the first position holding magnet 42 so that the same poles thereof are opposite to each other, resulting in both permanent magnets repelling each other. The second position holding magnet 42 is held on a holder 43 formed into a substantially U-shape in plane and arranged in proximity to a forward end of a base member 13. The holder 43 is formed on a rear surface thereof with a nut section 44, which is threadedly fitted therein with a screw shaft 45. The screw shaft 45 is adapted to be rotated by a motor 46 arranged on the base member 13, so that the second position holding magnet 42 held on the holder 43 may be slid in either a left direction or a right direction depending on a direction of rotation of the screw shaft 45. The remaining part of the illustrated embodiment may be constructed in substantially the same manner as the first embodiment described above.

In the illustrated embodiment as well as the second embodiment described above, when the second permanent magnet 32 provided on the vertical vibrator 20 is shifted in a longitudinal direction by the body weight of a person on a body carrying section, the first permanent magnet 31 is moved with such movement of the second permanent magnet 32, so that relative positional relationship therebetween may be varied. In this respect, in the illustrated embodiment, when the screw shaft 45 is rotated through the motor 46 to vary a position of the second position holding magnet 42, an opposite area between the second position holding magnet 42 and the first position holding magnet 41 is varied to permit a variation in repulsion force therebetween. Such a variation in repulsion force permits adjustment in interval c between the second position holding magnet 42 and the first position holding magnet 41, resulting in an initial set position (interval a and opposite area b) between the first permanent magnet 31 and the second permanent magnet 32 being rendered constant.

In the illustrated embodiment, the first and second position holding magnets 41 and 42 are so arranged that poles thereof identical with each other are rendered opposite to each other to adjust a position of the first permanent holding magnet 31 utilizing repulsion force therebetween. However, the illustrated embodiment is not limited to such arrangement. Thus, in the illustrated embodiment, the first position holding magnet 41 and second position holding magnet 42 may be so arranged that poles thereof different from each other are opposite to each other. In this instance, suction force between the first magnet 41 and the second magnet 42 permits the moving structure 35 on which the first permanent magnet 31 is held to be forwardly moved.

Figure 7:
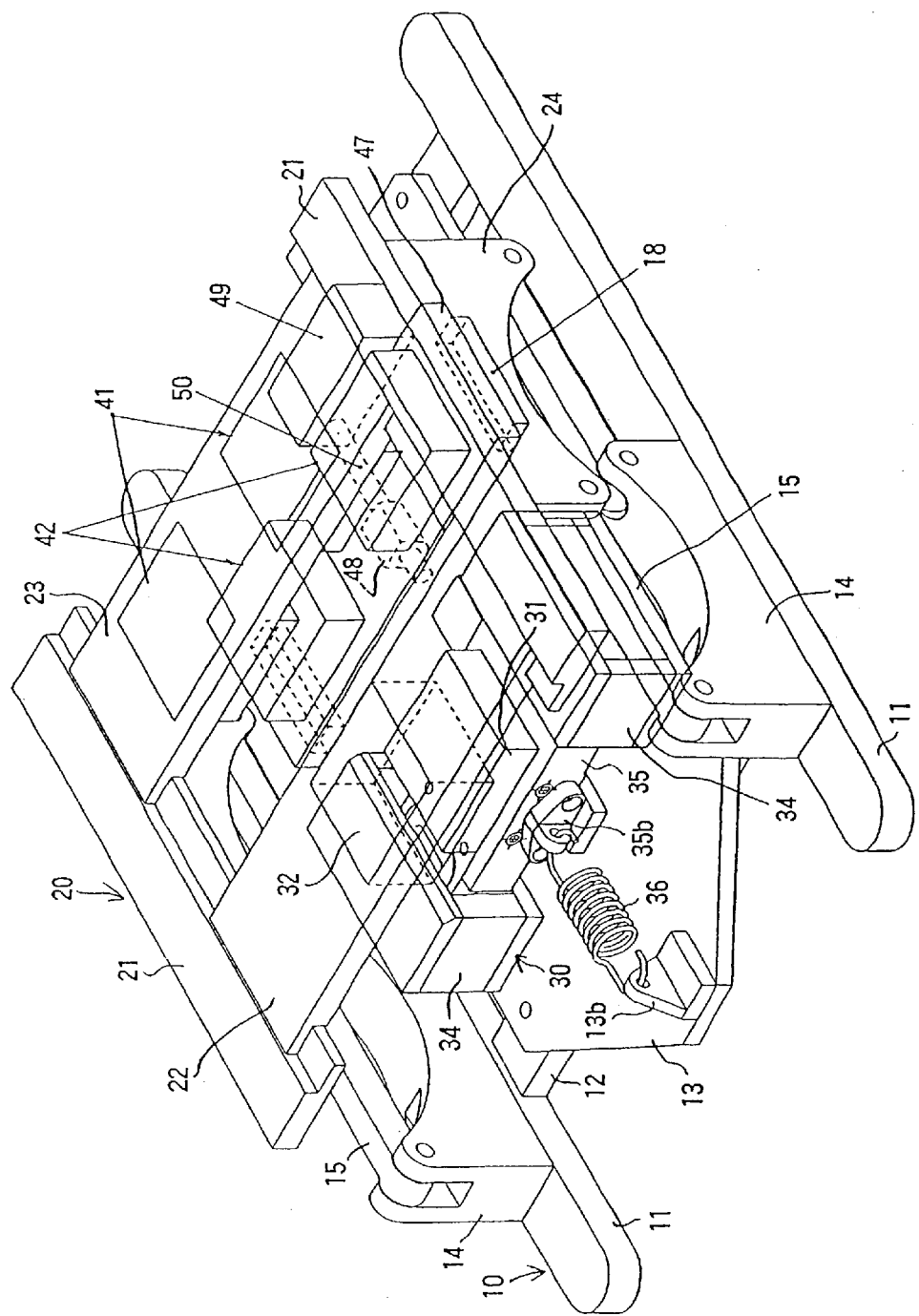
FIG. 7 is a perspective view showing a vibration application unit incorporated a fourth embodiment of a motion sickness expression apparatus according to the present invention.

Referring now to FIG. 7, a fourth embodiment of the present invention is illustrated. In the illustrated embodiment, a position holding means for keeping an opposite area of each of first and second permanent magnets 31 and 32 opposite to each other and an interval therebetween constant is constructed by providing two first position holding magnets 41 on a connection plate 23 arranged in the rear of a vertical vibrator 20 and providing two second position holding magnets 42 on a base member 13 in a manner to be opposite to the first position holding magnets 41. In this instance, the first position holding magnets 41 and second position holding magnets 42 are so arranged that the same poles thereof are opposite to each other to permit the magnets 41 and 42 to repel each other.

More specifically, the second position holding magnets 42 are held on a slide plate 47 arranged so as to be slidable in a longitudinal direction along a linear guide 18 located on the base member 13. The slide plate 47 is provided with a nut member 48, in which a screw shaft 50 is threadedly fitted. The screw shaft 50 is rotated through a motor 49 arranged rather in proximity to a rear end of the base member 13. Thus, when the motor 49 is driven to rotate the screw shaft 50, a degree of threaded engagement between the screw shaft 50 and the nut member 48 is varied, resulting in the slide plate 47 being moved in the longitudinal direction.

The remaining part of the illustrated embodiment may be constructed in substantially the same manner as the first embodiment described above.

In the illustrated embodiment thus constructed, when a person gets on a body carrying section to cause relative positional relationship between the first permanent magnet 31 and the second permanent magnet 32 to be varied during non-application of vibration, the motor 49 of the position holding means is driven to rotate the screw shaft 50, leading to movement of the slide plate 47 in the longitudinal direction. This permits an opposite area of the second position holding magnets 42 held on the slide plate 47 with respect to the first position holding magnets 41 to be varied, leading to a variation in repulsion force therebetween, resulting in the vertical vibrator 20 being shifted, so that the relative positional relationship between the first permanent magnet 31 and the second permanent magnet 32 may be kept constant.

As described above, the present invention is so constructed that application of vibration is carried out by varying repulsion force between the first permanent magnet 31 and the second permanent magnet 32. In this instance, in order to eliminate a so-called bottom touch feeling, it is preferable to employ a means for raising an equilibrium position to supplement force during upward vibration of the vertical vibration 20. Such a means is not limited to any specific structure. For example, the means, as shown in FIGS. 1, 4 and 5, may be constructed in such a manner that two first auxiliary magnets 51 and 52 are arranged on the connection plate 23 positioned rearwardly of the vertical vibrator 20 and two second auxiliary magnets 53 and 54 are fixedly mounted on the base member 13 so as to be opposite to the first auxiliary magnets 51 and 52. The first auxiliary magnets 51 and 52 and second auxiliary magnets 53 and 54 are so arranged that the same poles thereof are opposite to permit the magnets to repel each other. Such arrangement permits repulsion force between the first permanent magnet 31 and the second permanent magnet 32 to be increased.

Figure 8:
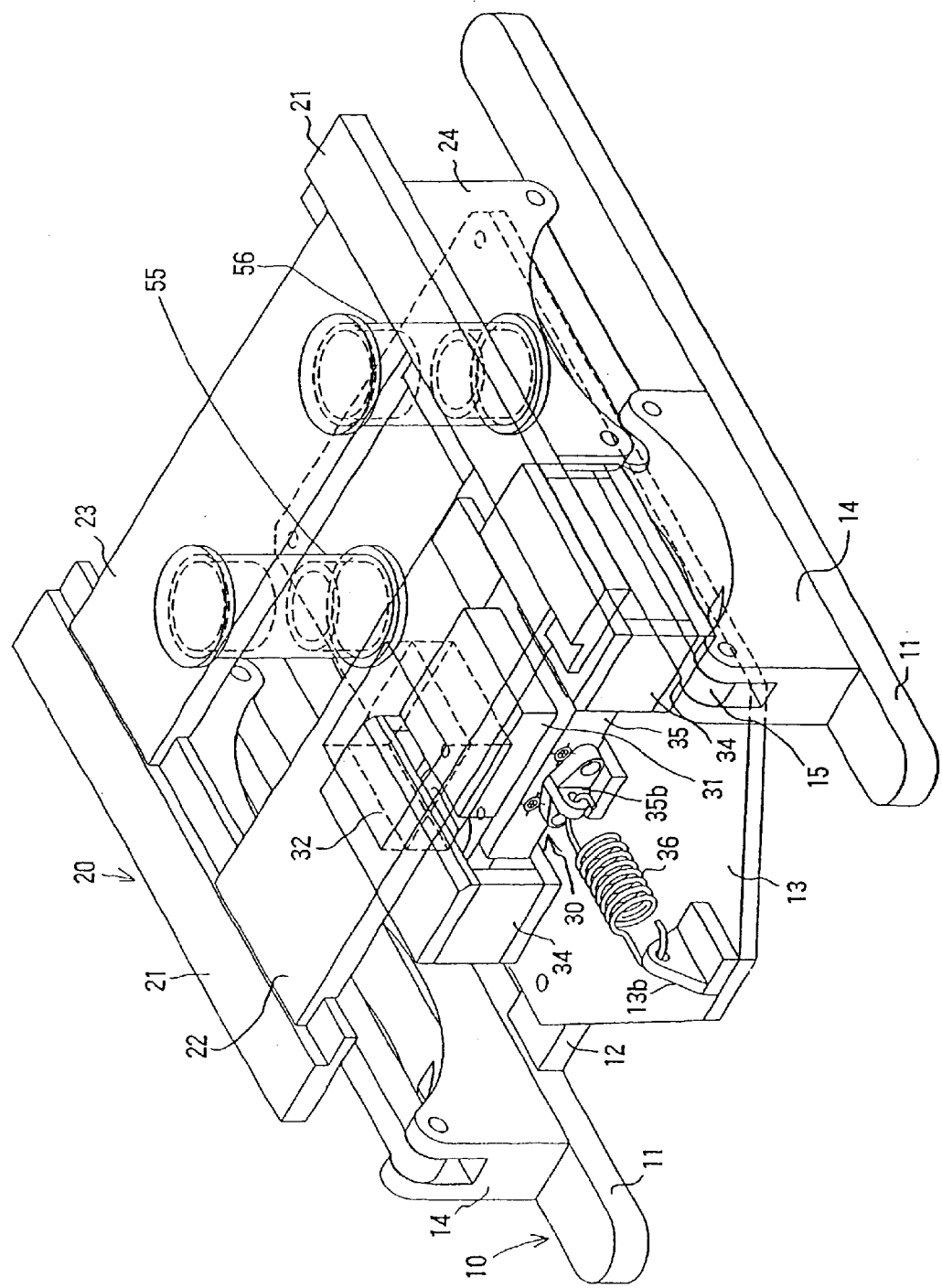
FIG. 8 is a perspective view showing a means for raising an equilibrium position of a vertical vibrator by way of example.
Figure 9:
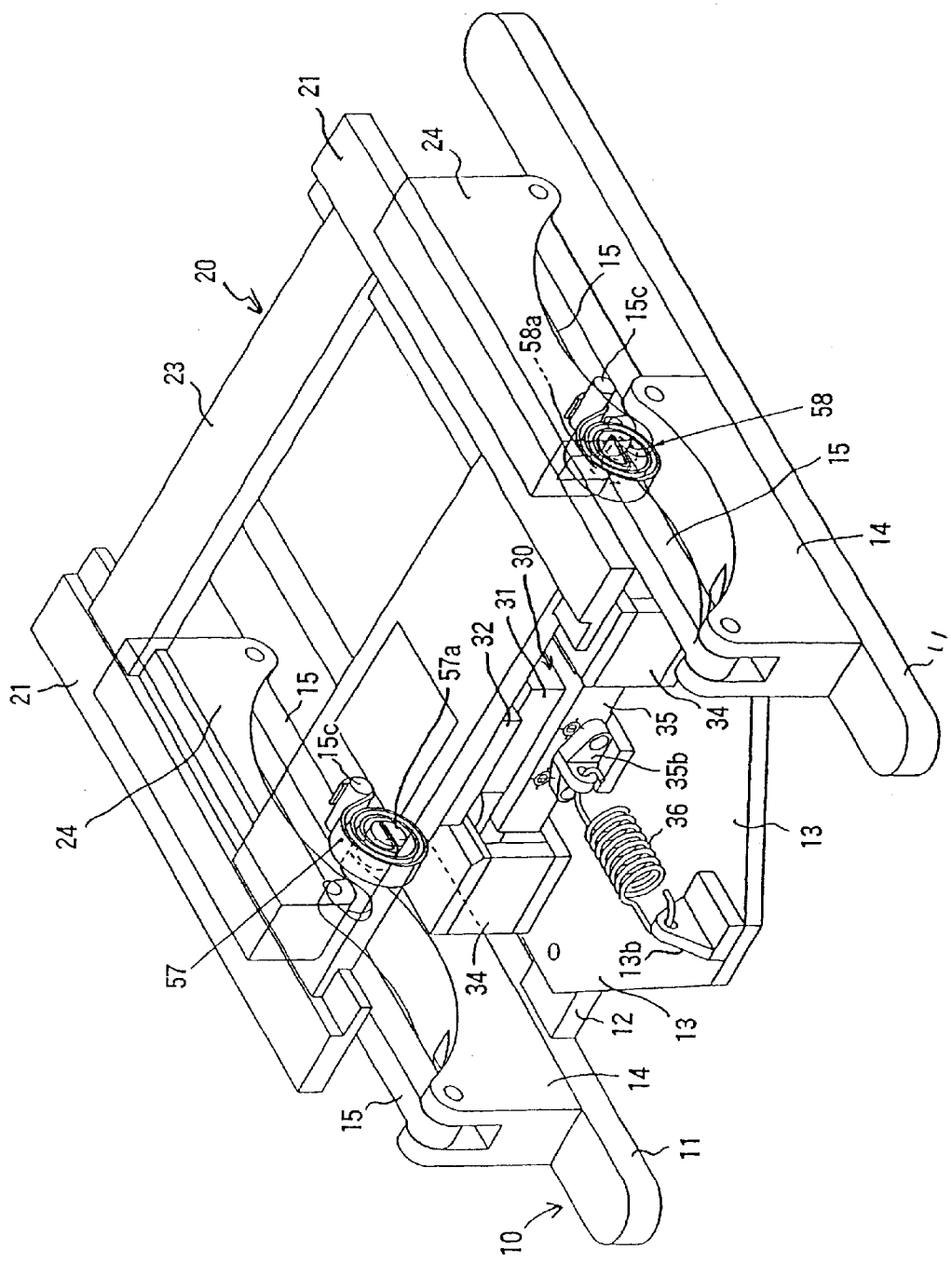
FIG. 9 is a perspective view showing a modification of a means for raising an equilibrium position of a vertical vibrator.
Figure 10:
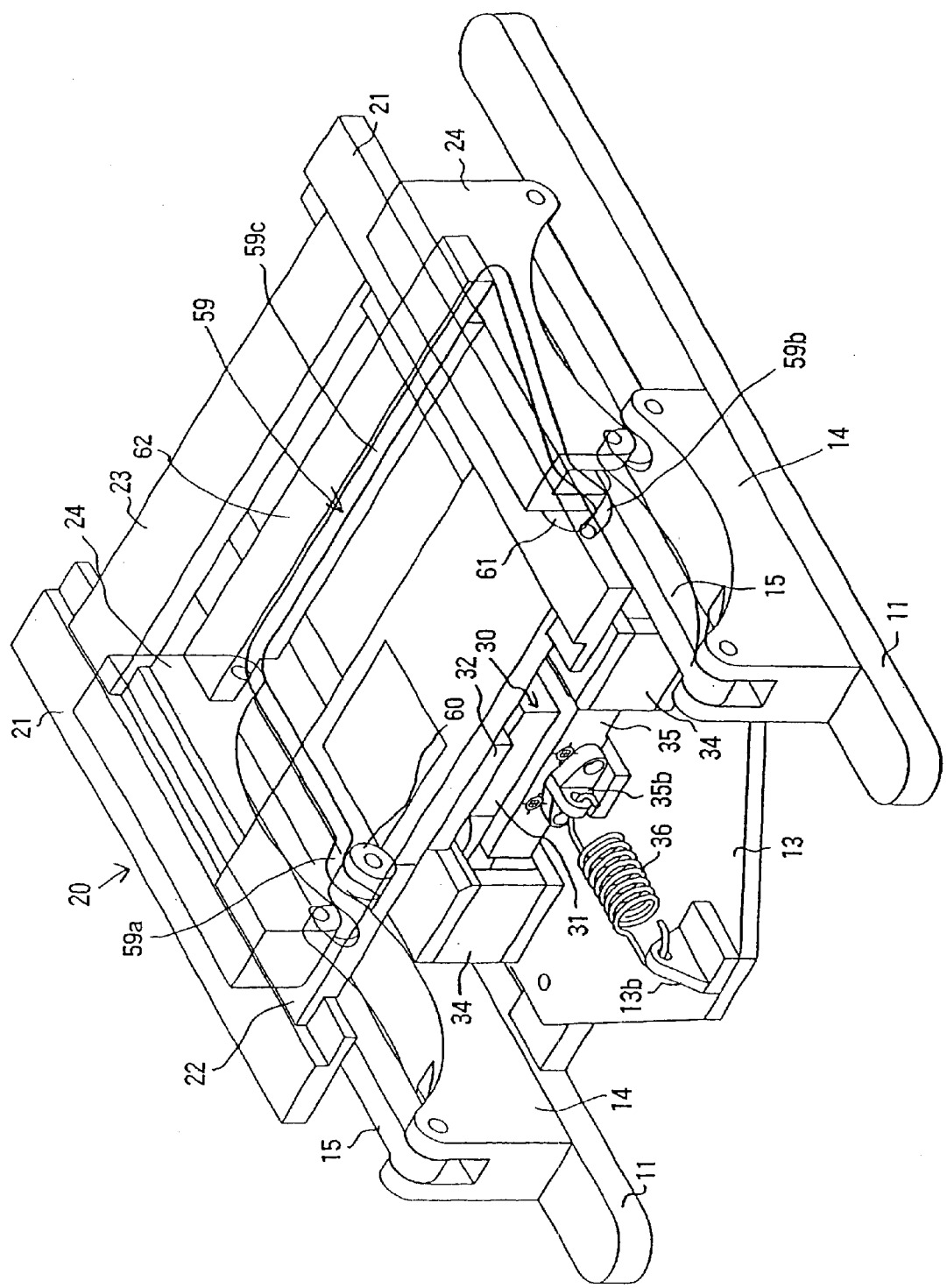
FIG. 10 is a perspective view showing another modification of a means for raising an equilibrium position of a vertical vibrator.

Alternatively, the means may be constructed so as to incorporate metal springs therein, as shown in each of FIGS. 8 to 10. More particularly, in FIG. 8, two coiled springs 55 and 56 are arranged between the base member 13 and the connection plate 23 positioned rearwardly of the vertical vibrator 20. In FIG. 9, two spiral springs 57 and 58 are connected at a central end thereof to pins 57a and 58a mounted on the brackets 14 arranged on the base 10 and at an outer peripheral end thereof to pins 15c mounted on one of the link members 15, respectively. Thus, winding-up of the spiral springs 57 and 58 to a predetermined degree causes the spiral springs to tend to expand, to thereby provide upward urging force.

In FIG. 10, a torsion bar 59 is arranged which is bent into a substantially U-shape while keeping one end thereof rotated relative to the other end thereof. The torsion bar 59 is engaged at both ends 59a and 59b thereof with projections 60 and 61 provided on the brackets 14 arranged on the base 10. Also, the torsion bar 59 is abutted at an intermediate portion 59c thereof against an auxiliary plate 62 arranged so as to extend between the brackets 24 arranged on the upward vibrator 20. Such arrangement permits restoring force of the torsion bar 59 to raise the auxiliary plate 62 about the ends 59a and 59b.

Figure 11:
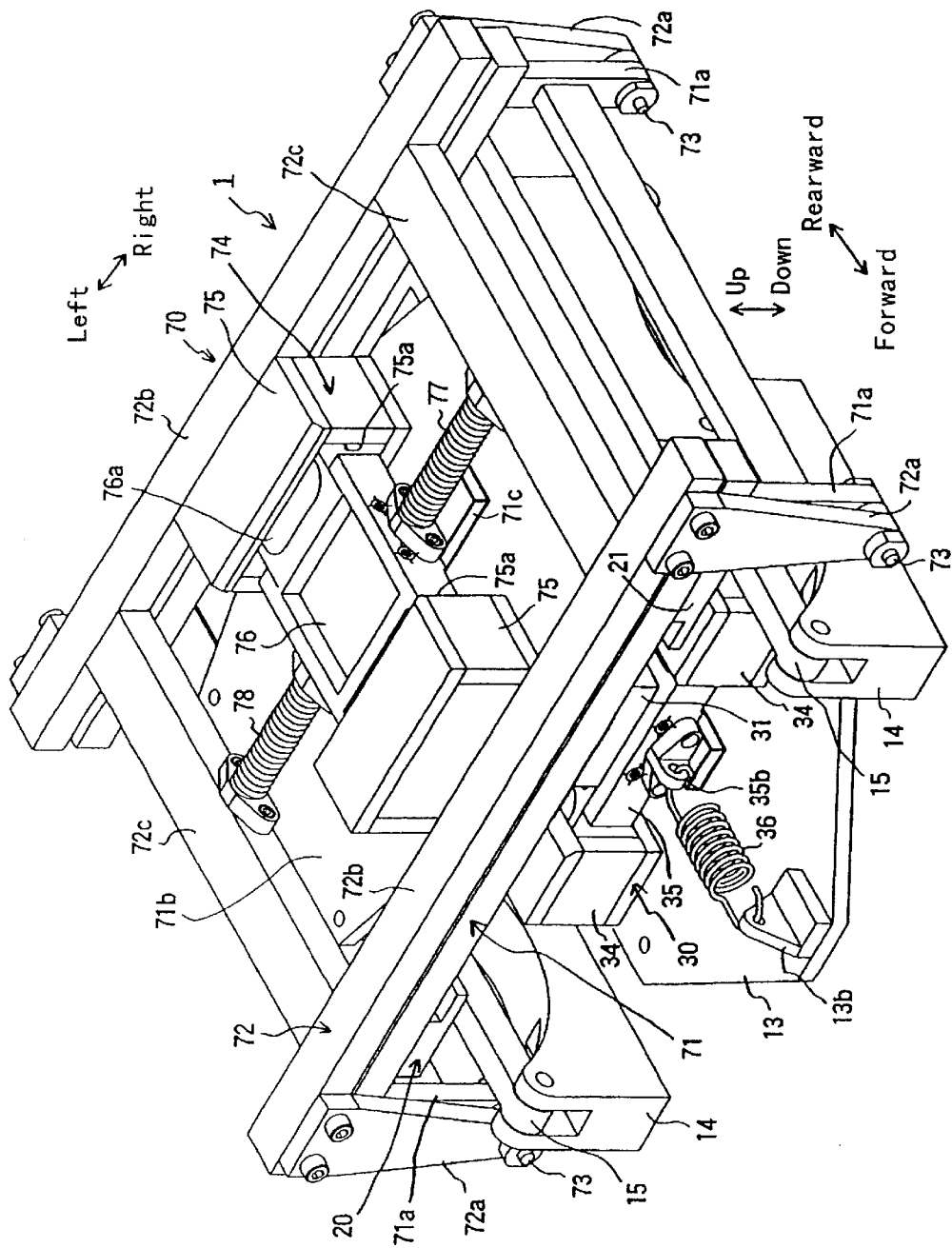
FIG. 11 is a perspective view showing a vibration application unit incorporated a fifth embodiment of a motion sickness expression apparatus according to the present invention.
Figure 12:
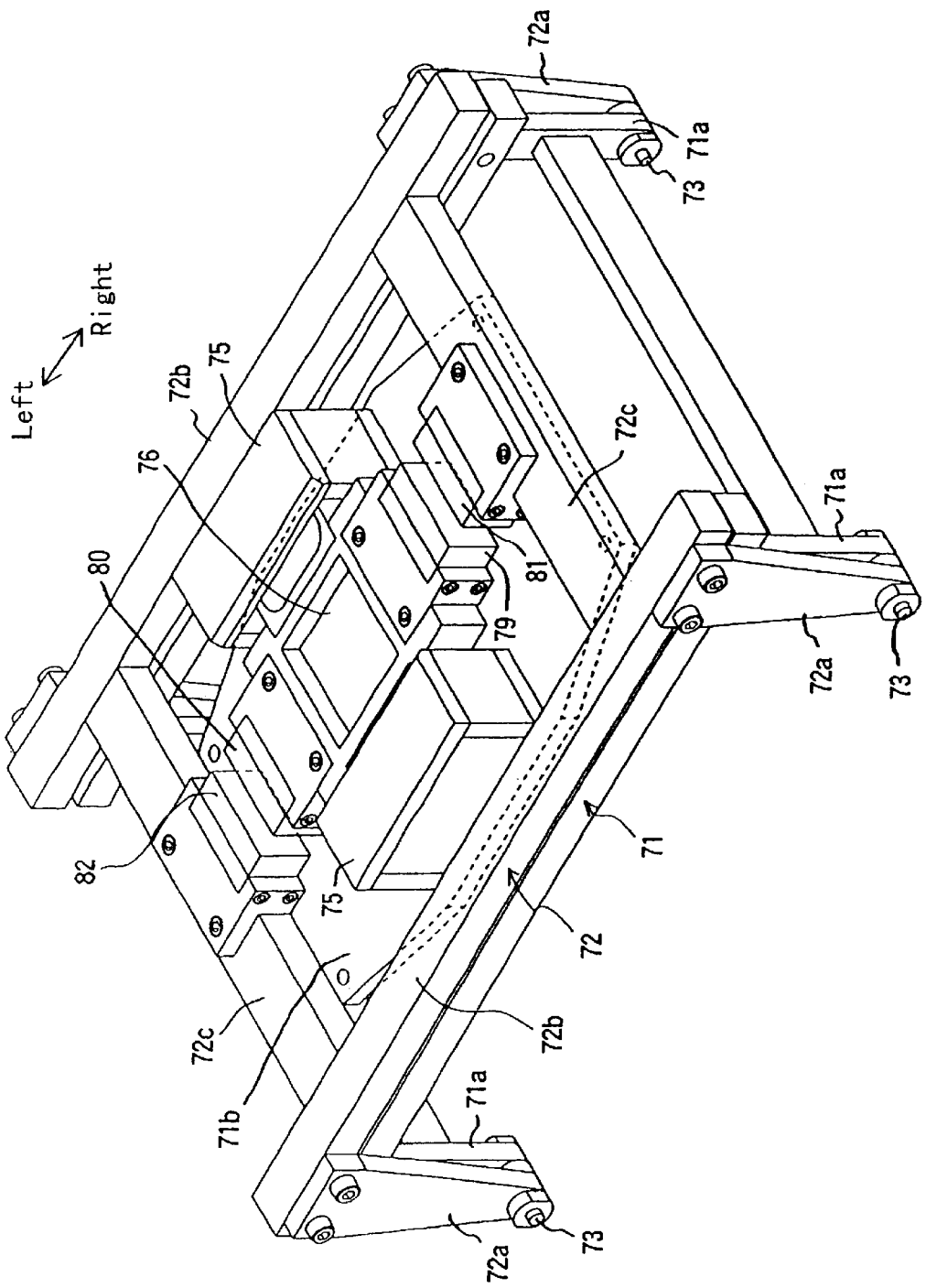
FIG. 12 is a perspective view showing a modification of a horizontal vibrator.

Referring now to FIGS. 11 and 12, a fifth embodiment of the present invention is illustrated. In the illustrated embodiment, a mechanism for vertically vibrating a vertical vibrator is constructed in substantially the same manner as that in the first embodiment described above, except that a horizontal vibrator 70 is carried on a vertical vibrator 20. Thus, in the illustrated embodiment, a body carrying section is carried on the horizontal vibrator 70.

The horizontal vibrator 70 includes a base frame 71 arranged on the vertical vibrator 20 and a horizontally movable member 72 formed into a substantially rectangular configuration and laminatedly arranged on the base frame 71. The base frame 71 is provided on four corners thereof with legs 71a so as to downwardly extend therefrom, on which legs 72a arranged on four corners of the horizontally movable member 72 so as to downwardly extending thereof are laminatedly arranged, respectively. The legs 71a and 72a thus laminated together are then connected to each other by means of connection pins 73, respectively, so that the horizontally movable member 72 may be movable with respect to the base frame 71 about the connection pins 73.

The horizontally movable member 72 includes first frames 72b arranged opposite to each other, between which an actuator 74 is arranged for horizontally moving the horizontally movable member 72. The actuator 74 may be constructed in substantially the same manner as an actuator 33 for moving a first permanent magnet 31 in a longitudinal direction. The actuator 74 includes box-like body casings 75 arranged on a base plate 71b of the base frame 71 between the first frames 72b opposite to each other and formed on surfaces thereof opposite to each other with slits 75a, a moving structure 76 provided on both sides thereof with vanes 76a, coils (not shown) respectively wound on the vanes 76a, and permanent magnets (not shown) respectively arranged in the body casings 75 so as to be spaced from the coils.

The horizontally movable member 72 also includes second frames 72c arranged opposite to each other and spring members 77 and 78 respectively arranged between one of the second frames 72c and the moving structure 76 and between the other second frame 72c and the moving structure 76. Thus, when the coils wound on the vanes 76a each are excited by a pulse current, the moving structure 76 is laterally moved in FIG. 11 along a guide member 71c provided on the base plate 71b.

The remaining part of the illustrated embodiment may be constructed in substantially the same manner as the first embodiment described above.

In operation of the illustrated embodiment thus constructed, when the actuator 33 provided on a base 10 is started and the actuator 74 of the horizontal vibrator 70 is started, a first permanent magnet 31 is moved in a longitudinal direction, so that an opposite area of the first permanent magnet 31 with respect to a second permanent magnet 32 is varied to vary repulsion force therebetween, so that the vertical vibrator 20 may be vertically vibrated. Concurrently, the horizontal movable member 72 of the horizontal vibrator 70 is laterally vibrated.

This results in the horizontally movable member 72 of the horizontal vibrator 70 being laterally vibrated while being vertically vibrated, so that both vertical vibration and horizontal vibration are applied to a body carrying section carried on the horizontally movable member 72, leading to random vibration of the body carrying section.

In this instance, application of vibration to the body carrying section is so controlled that a frequency of vibration of the body carrying section and an acceleration thereof each are within a range sufficient to facilitate expression of motion sickness as in the embodiments described above. In this regard, the illustrated embodiment provides random vibration as described above, which facilitates expression of motion sickness as compared with only vertical vibration, even when a frequency of the vibration and an amplitude thereof are significantly reduced.

The horizontal vibrator 70 may be constructed in a manner other than the above-described one. For example, it may be constructed as shown in FIG. 12, wherein permanent magnets are substituted for the springs 77 and 78 shown in FIG. 11. More specifically, the moving structure 76 is provided on both ends thereof with permanent magnets 79 and 80 and the second frames 72c of the horizontally movable member 72 opposite to each other are provided thereon with permanent magnets 81 and 82 so as to repel the permanent magnets 79 and 80, respectively. Thus, lateral movement of the moving structure 76 leads to movement of the horizontally movable member 72.

Further, in the illustrated embodiment, the horizontally movable member 72 is laterally vibrated. Alternatively, it may be vibrated in the longitudinal direction perpendicular to the lateral direction.

Figure 13:
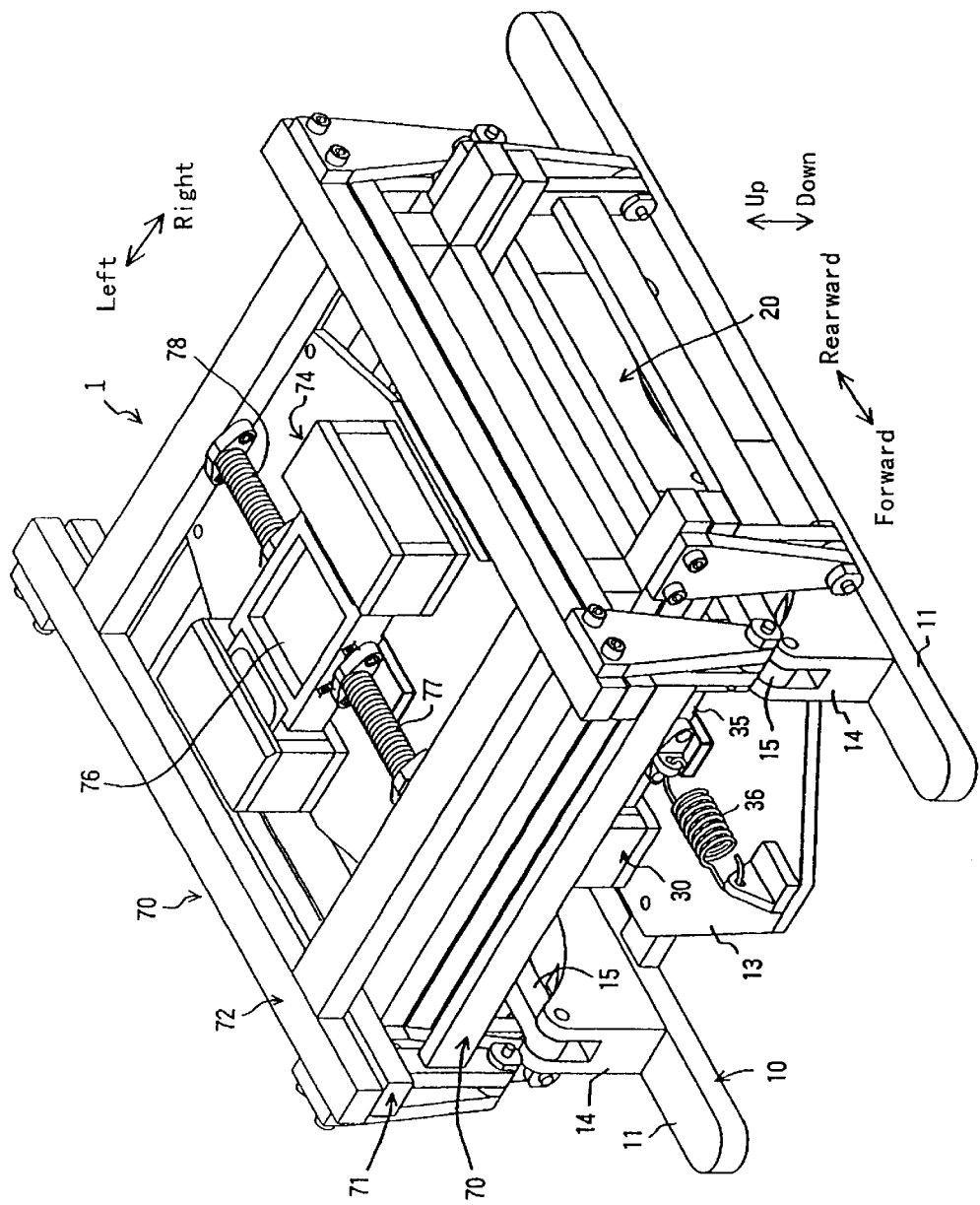
FIG. 13 is a perspective view showing two horizontal vibrators laminated on each other.

In addition, the illustrated embodiment, as shown in FIG. 13, may be so constructed that the horizontal vibrator 70 having the horizontally movable member 72 arranged thereon so as to be laterally vibrated is further provided thereon with an additional horizontally movable vibrator 70 which is vibrated in the longitudinal direction which is a direction perpendicular to the lateral direction. Such construction permits vibration to be applied to the body carrying section in the vertical, lateral and longitudinal directions, resulting in the vibration being rendered more random, to thereby more facilitate expression of motion sickness.

Now, the present invention will be more readily understood with reference to the following test example; however, the example is intended to illustrate the invention and is not to be construed to limit the scope of the invention.

Test Example

Figure 15:
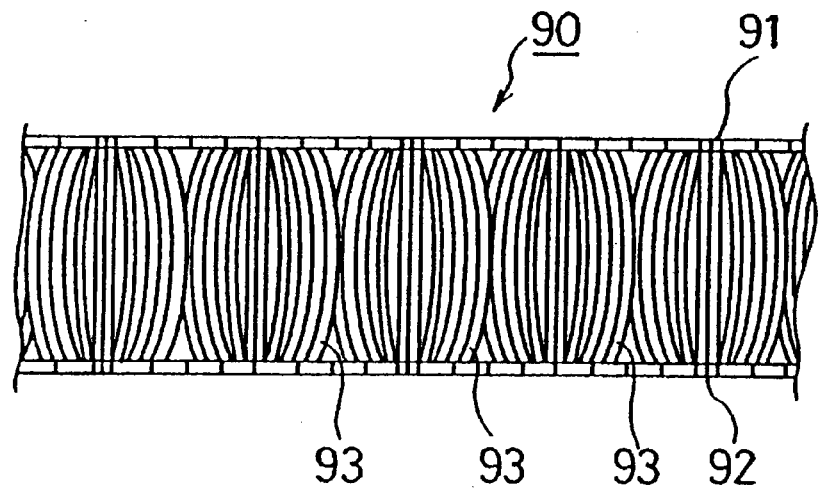
FIG. 15 is a sectional view showing a body carrying section incorporated in the motion sickness expression apparatus of FIG. 14.
Figure 16:
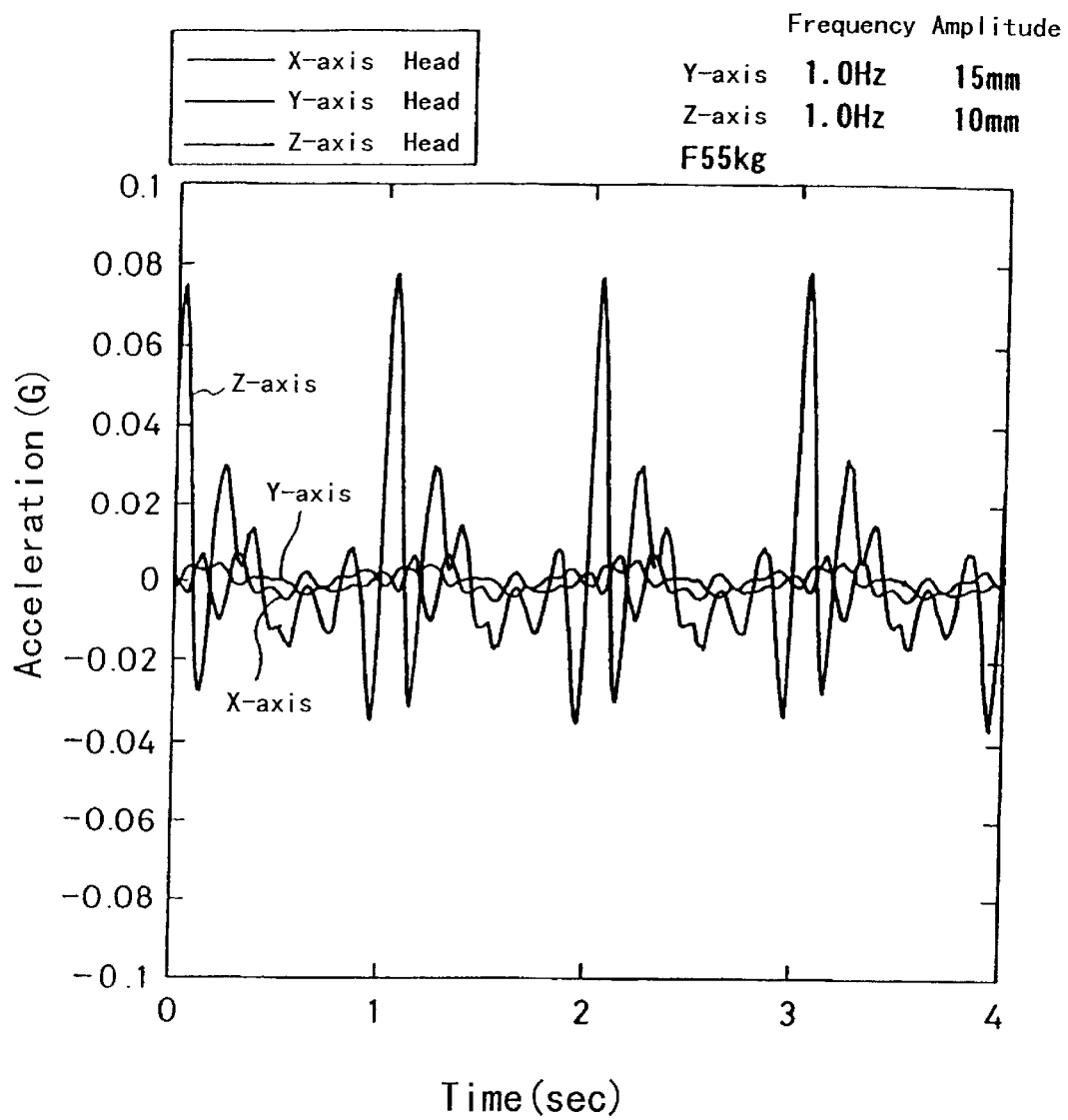
FIGS. 16 to 18 each are a graphical representation showing results of a test by way of example.
Figure 17:
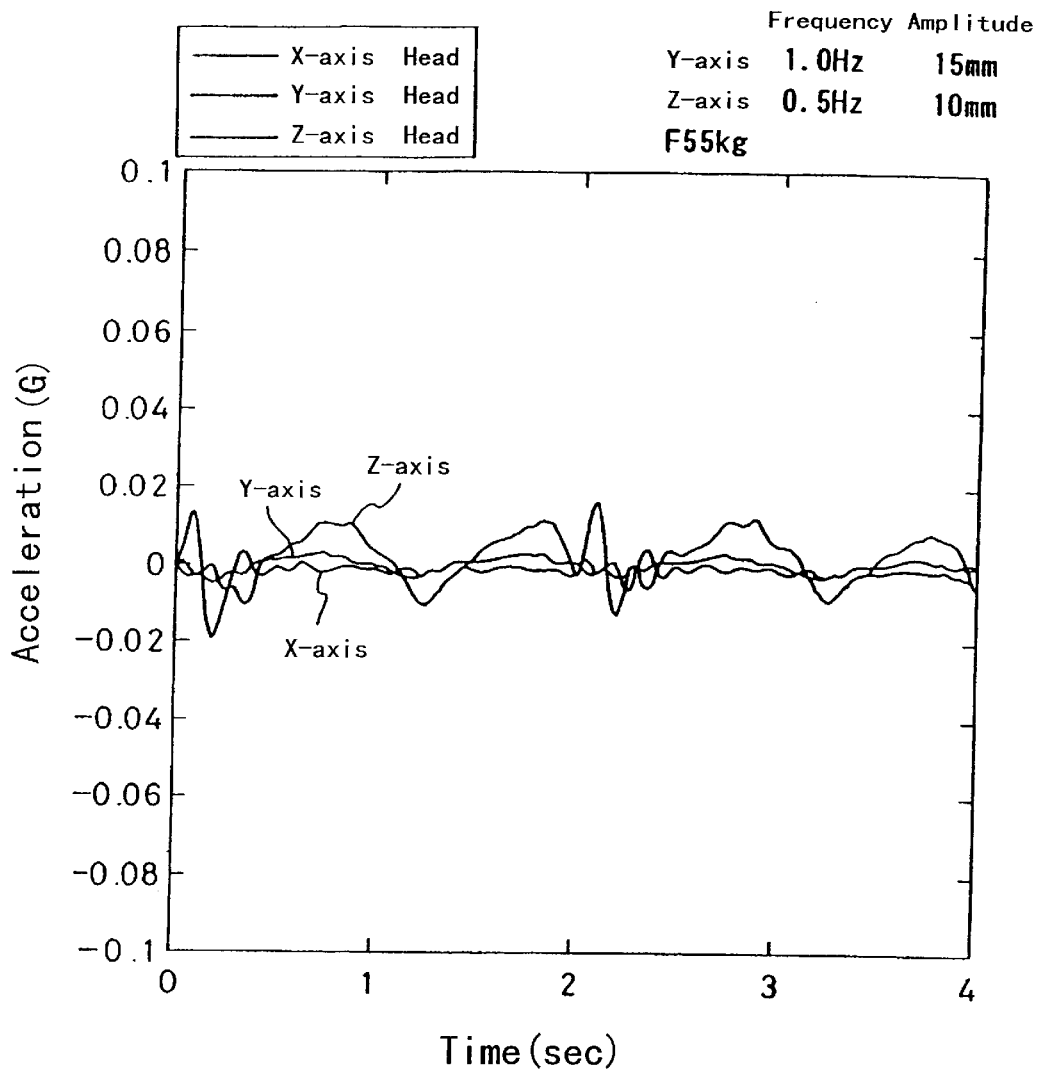
Figure 18:
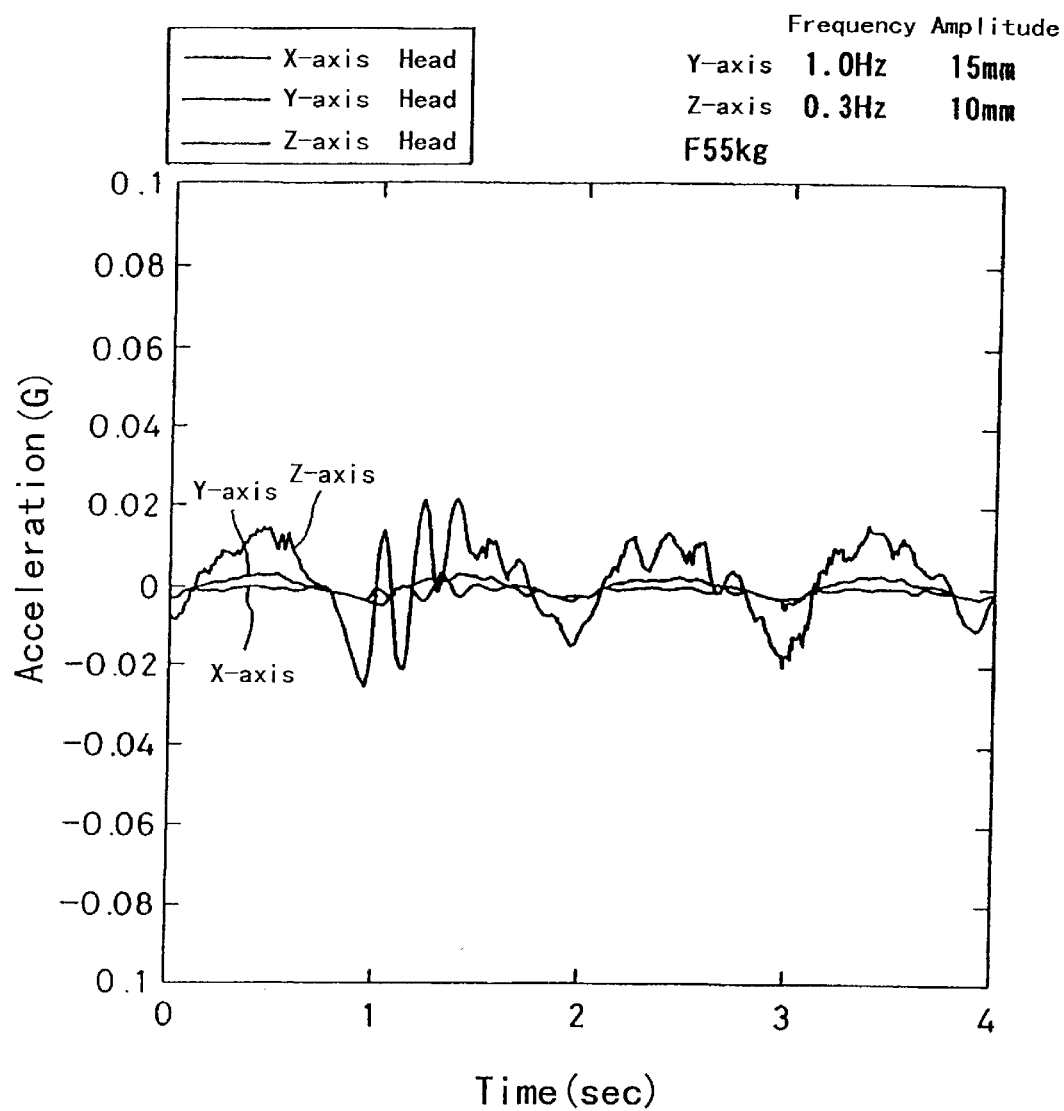

The vibration application unit shown in FIG. 11 was used. A subject was mounted on a head thereof with an acceleration pickup sensor while being kept carried on the body carrying section, so that an acceleration was measured by varying an input frequency. The results were as shown in FIGS. 16 to 18. The body carrying section 80 included the seat back 81 and seat cushion 82 (FIG. 14). A cushion made of urethane resin was arranged on a seat frame constituting the seat back 81 and seat cushion 82 and then covered with a skin member. However, the body carrying section is not limited to such a construction. For example, it may be constructed as shown in FIG. 15, wherein a net-like skin member 90 which includes a front mesh layer 91, a rear mesh layer 92 and a number of piles 93 arranged between the front mesh layer 91 and the rear mesh layer 92 to connect both layers to each other therethrough overlays the seat frame. Also, the first permanent magnet 31 and second permanent magnet 32 each were constituted by a double-pole magnet arranged as shown in FIG. 20(a). A body weight of the subject was 55 kg.

In each of FIGS. 16 to 18, a frequency and an amplitude in a column "Y axis" indicate a vibration application frequency of the actuator 74 of the horizontal vibrator 70 and a magnitude of movement of the moving structure 76, respectively. A frequency and a distance in a column "Z axis" indicate a vibration application frequency of the actuator 33 arranged on the base 10 and a quantity of displacement of the moving structure 35.

As will be noted from FIGS. 16 to 18, a random waveform at a low frequency occurred in each of the X-axis, Y-axis and Z-axis directions and an acceleration was up to about 0.08 G, to thereby provide vibration which facilitates expression of motion sickness. The acceleration is somewhat smaller than a range of 0.10 to 0.20 G (FIG. 19) which is apt to permit remarkable expression of motion sickness. In this respect, data shown in FIG. 19 are strictly based on a vertical acceleration; whereas use of the vibration acceleration unit 1 shown in FIG. 11 leads to random vibration, therefore, even an acceleration as low as 0.10 G or less facilitates expression of motion sickness.

As can be seen form the foregoing, the motion sickness expression apparatus of the present invention has the vibration application unit which utilizes repulsion force between the permanent magnets incorporated therein, to thereby apply vibration at a low frequency and a low acceleration to the body carrying section while being simplified in structure. Thus, it permits motion sickness to be expressed in a room such as a laboratory without running a vehicle on which the body carrying section is carried, to thereby significantly contribute to development of pharmaceuticals or a seat for preventing motion sickness. Also, in general, the more an environment in which a person is placed is quiet or the less a matter which diverts his or her mind is, the more motion sickness is expressed by a psychological action. In this respect, the apparatus of the present invention is constructed so as to apply vibration to the body carrying unit utilizing repulsion force between the permanent magnets, to thereby minimize generation of noise, resulting in being highly suitable for expression of motion sickness.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A motion sickness expression apparatus comprising:
   a body carrying section for carrying a human body thereon; and
   a vibration application unit for supporting said body carrying section in a manner to permit vibration of said body carrying section;
   said vibration application unit including:
      a base;
      a vertical vibrator to which said base is connected so as to be vertically movable with respect to said base through link members and which is constructed so as to support said body carrying section thereon; and
      a magnetic spring mechanism including permanent magnets arranged on said base and vertical vibrator so as to repel each other, respectively;
      said magnetic spring mechanism including permanent magnets arranged on said base and vertical vibrator so as to repel each other, respectively;
      said magnetic spring mechanism also including an actuator for moving said permanent magnet arranged on said base to vary areas of said permanent magnets opposite to each other, leading to vibration of said vertical vibrator;
      whereby vibration of said body carrying section is controlled through said vertical vibrator vibrated at random by repulsion force of said permanent magnet on said vertical vibrator with respect to said permanent magnet on said base due to driving of said actuator so that an acceleration of vibration of said body carrying section falls within a motion sickness expression region.

2. A motion sickness expression apparatus as defined in claim 1, wherein said permanent magnet on said base and said permanent magnet on said vertical vibrator during non-application of vibration are arranged in positional relationship which permits said permanent magnets to be contacted with each other at portions thereof increased in magnetic gradient.

3. A motion sickness expression apparatus as defined in claim 1, further comprising an auxiliary spring mechanism for supplementing holding force for spacedly holding said permanent magnets at a predetermined interval;
   said auxiliary spring mechanism being arranged between said base and said vertical vibrator.

4. A motion sickness expression apparatus as defined in claim 1, further comprising a position holding means for keeping opposite areas of said permanent magnet on said base and said permanent magnet on said vertical vibrator and an interval therebetween during non-application of vibration constant.

5. A motion sickness expression apparatus as defined in claim 4, wherein said position holding means includes a first position holding magnet arranged forwardly or rearwardly in a direction of movement of a moving structure of an actuator for movably holding said permanent magnet arranged on said base and a second position holding magnet which is arranged opposite to said first position holding magnet on said base and of which an opposite area with respect to said first position holding magnet is adjustable.

6. A motion expression apparatus as defined in claim 4, wherein said horizontal vibrator includes a base frame carried on said vertical vibrator, a horizontally movable member arranged so as to be movable with respect to said base frame, and an actuator connected through spring members to said horizontally movable member.

7. A motion sickness expression apparatus as defined in claim 6, further comprising an additional horizontal vibrator arranged in a direction perpendicular to a direction of vibration of said horizontal vibrator on said horizontal vibrator.

8. A motion sickness expression apparatus as defined in claim 1, wherein said body carrying section is formed into a seat-like configuration and includes a seat cushion and seat back.

9. A motion sickness expression apparatus as defined in claim 1, said permanent magnets arranged on said base and vertical vibrator each are constituted by a multi-pole magnet.

10. A motion sickness expression apparatus as defined in claim 9, wherein said permanent magnets arranged on said base and vertical vibrator each are constituted by a double-pole magnet; and said permanent magnets are so arranged that the same poles thereof are opposite to each other while keeping a direction of operation of said permanent magnet on said base parallel to an interface between an N pole of said double-pole magnet and an S pole thereof.

11. A motion sickness expression apparatus as defined in claim 9, wherein said permanent magnets arranged on said base and vertical vibrator each are constituted by a double-pole magnet; and said permanent magnets are so arranged that the same poles thereof are opposite to each other while keeping a direction of operation of said permanent magnet on said base perpendicular to an interface between an N pole of said double-pole magnet and an S pole thereof.

12. A motion sickness expression apparatus as defined in claim 1, wherein said acceleration of vibration of said body carrying section to induce said motion sickness is from 0.10 G to 0.20 G.

13. A motion sickness expression apparatus comprising:

a body carrying section for carrying a human body thereon; and a vibration application unit for supporting said body carrying section in a manner to permit vibration of said body carrying section;

said vibration application unit including:
a base;
a vertical vibrator to which said base is connected so as to be vertically movable with respect to said base through link members;
a horizontal vibrator mounted on said vertical vibrator so as to be horizontally movable and constructed so as to support said body carrying section thereon; and
a magnetic spring mechanism including permanent magnets arranged on said base and vertical vibrator so as to repel each other, respectively;
said magnetic spring mechanism also including an actuator for moving said permanent magnet arranged on said base to vary areas of said permanent magnets opposite to each other, leading to vibration of said vertical vibrator;
whereby vibration of said body carrying section is controlled through said vertical vibrator and horizontal vibrator vibrated at random by repulsion force of said permanent magnet on said vertical vibrator with respect to said permanent magnet on said base due to driving of said actuator so that an acceleration of vibration of said body carrying section falls within a motion sickness expression region.

14. A motion sickness expression apparatus as defined in claim 13, wherein said permanent magnet on said base and said permanent magnet on said vertical vibrator during non-application of vibration are arranged in a positional relationship which permits said magnets to be contacted with each other at portions thereof increased in magnetic gradient.

15. A motion sickness expression apparatus as defined in claim 13, further comprising an auxiliary spring mechanism for supplementing a holding force for spacedly holding said permanent magnets at a predetermined interval;

said auxiliary spring mechanism being arranged between said base and said vertical vibrator.

16. A motion sickness expression apparatus as defined in claim 15, further comprising a position holding means including a first position holding magnet arranged one of forwardly and rearwardly in a direction of movement of a moving structure of an actuator for movably holding said permanent magnet arranged on said base and a second position holding magnet which is arranged opposite to said first position holding magnet on said base and of which an opposite area with respect to said first position holding magnet is adjustable.

17. A motion sickness apparatus as defined in claim 13, wherein said body carrying section is formed into a seat-like configuration and includes a seat cushion and a seat back.

18. A motion sickness apparatus as defined in claim 17, wherein said permanent magnets arranged on said base and vertical vibrator each are constituted by a multi-pole magnet.

19. A motion sickness apparatus as defined in claim 18, wherein said permanent magnets arranged on said base and vertical vibrator each are constituted by a double-pole magnet; and said permanent magnets are so arranged that the same poles thereof are opposite to each other while keeping a direction of operation of said permanent magnet on said base parallel to an interface between an N pole of said double-pole magnet and an S pole thereof.

20. A motion sickness apparatus as defined in claim 18, wherein said permanent magnets arranged on said base and vertical vibrator each are constituted by a double-pole magnet; and said permanent magnets are so arranged that the same poles thereof are opposite to each other while keeping a direction of operation of said permanent magnet on said base perpendicular to an interface between an N pole of said double pole magnet and an S pole thereof.

21. A motion sickness expression apparatus as defined in claim 13, wherein said acceleration of vibration of said body carrying section to induce said motion sickness is from 0.10 G to 0.20 G.

* * * * *